(12) United States Patent
Teraoka et al.

(10) Patent No.: US 10,725,772 B2
(45) Date of Patent: Jul. 28, 2020

(54) ELECTRIC CONTROL DEVICE FOR VEHICLES, PROGRAM UPDATING METHOD, AND SERVER APPARATUS

(71) Applicant: HITACHI AUTOMOTIVE SYSTEMS, LTD., Hitachinaka-shi, Ibaraki (JP)

(72) Inventors: Hidetoshi Teraoka, Tokyo (JP); Kenichi Kurosawa, Hitachinaka (JP); Fumiharu Nakahara, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/096,306

(22) PCT Filed: Apr. 19, 2017

(86) PCT No.: PCT/JP2017/015770
§ 371 (c)(1),
(2) Date: Oct. 25, 2018

(87) PCT Pub. No.: WO2017/188096
PCT Pub. Date: Nov. 2, 2017

(65) Prior Publication Data
US 2019/0138298 A1 May 9, 2019

(30) Foreign Application Priority Data
Apr. 27, 2016 (JP) .................................. 2016-089031

(51) Int. Cl.
G06F 8/658 (2018.01)
G06F 9/445 (2018.01)
(Continued)

(52) U.S. Cl.
CPC .............. *G06F 8/658* (2018.02); *B60R 16/02* (2013.01); *G06F 9/445* (2013.01); *G06F 11/00* (2013.01); *G06F 8/66* (2013.01); *H04L 67/12* (2013.01)

(58) Field of Classification Search
CPC . G06F 8/658; G06F 8/66; G06F 9/445; G06F 11/00; H04L 67/12; B60R 16/02
(Continued)

(56) References Cited

U.S. PATENT DOCUMENTS

2006/0200502 A1   9/2006 Tanaka et al.
2007/0294685 A1  12/2007 Oh
(Continued)

FOREIGN PATENT DOCUMENTS

EP    2 680 135 A1     1/2014
JP    2003-337723 A   11/2003
(Continued)

OTHER PUBLICATIONS

International Search Report of PCT/JP2017/015770 dated Aug. 1, 2017.
(Continued)

*Primary Examiner* — John Q Chavis
(74) *Attorney, Agent, or Firm* — Mattingly & Malur, PC

(57) ABSTRACT

An electric control device for vehicles capable of updating an old program stored in a storage unit with a new program. A reception unit sequentially receives a plurality of pieces of division data acquired by dividing difference data, which includes a data section based on a difference between the old program and the new program and a command section used for generating the new program by reflecting the data section on the old program, or difference compression data acquired by compressing the difference data for every predetermined data length A restoration process restores the new program
(Continued)

based on each division data received by the reception unit and the old program. If at least a part of the command section and the data section is not included in the division data received by the reception unit, the restoration unit suspends the restoration process and waits for reception of next division data.

11 Claims, 17 Drawing Sheets

(51) Int. Cl.
*B60R 16/02* (2006.01)
*G06F 11/00* (2006.01)
*G06F 8/65* (2018.01)
*H04L 29/08* (2006.01)

(58) Field of Classification Search
USPC .......................................................... 717/170
See application file for complete search history.

(56) References Cited

U.S. PATENT DOCUMENTS

| 2014/0006555 A1* | 1/2014 | Shields | H04L 67/12 |
| | | | 709/217 |
| 2014/0245284 A1 | 8/2014 | Alrabady et al. | |
| 2014/0282470 A1* | 9/2014 | Buga | G06F 8/65 |
| | | | 717/170 |

FOREIGN PATENT DOCUMENTS

| JP | 2004-234503 A | 8/2004 |
| JP | 2006-79492 A | 3/2006 |
| JP | 2012-069131 A | 4/2012 |

OTHER PUBLICATIONS

Extended European Search Report received in corresponding European Application No. 17789380.7 dated Dec. 16, 2019.

* cited by examiner

[FIG. 1]
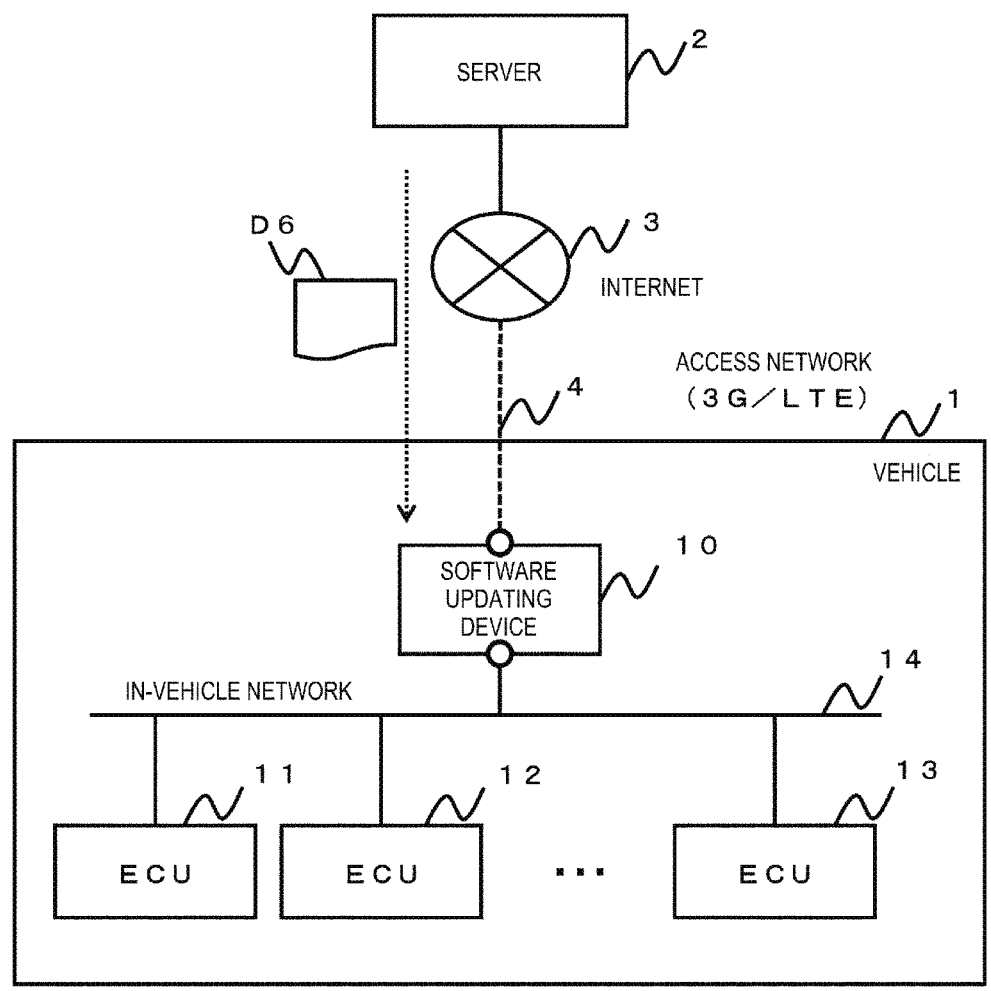

[FIG 2]
(a)
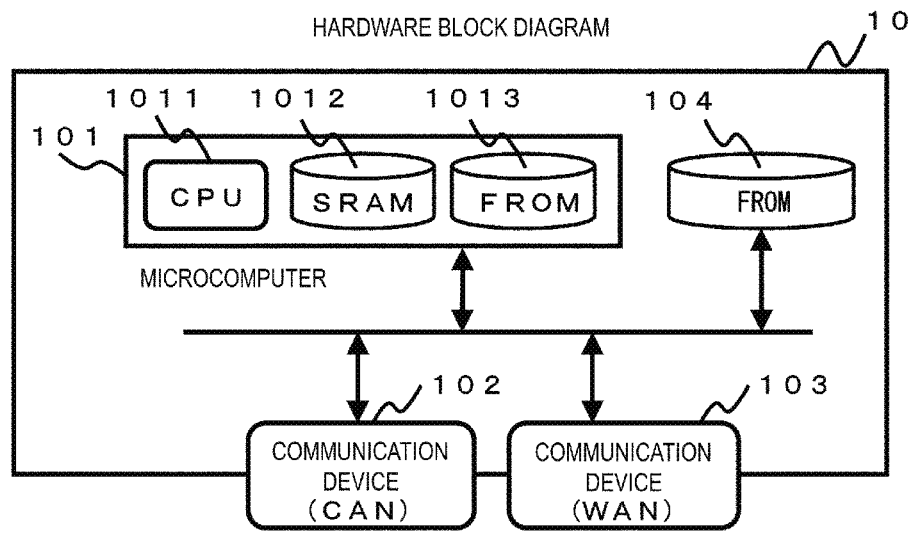
(b)
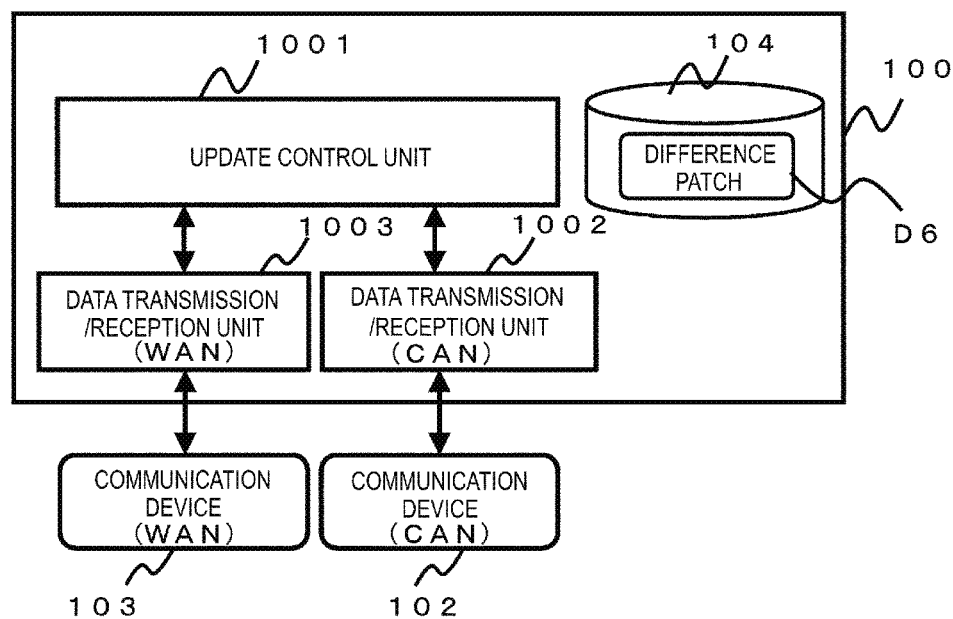

[FIG. 3]
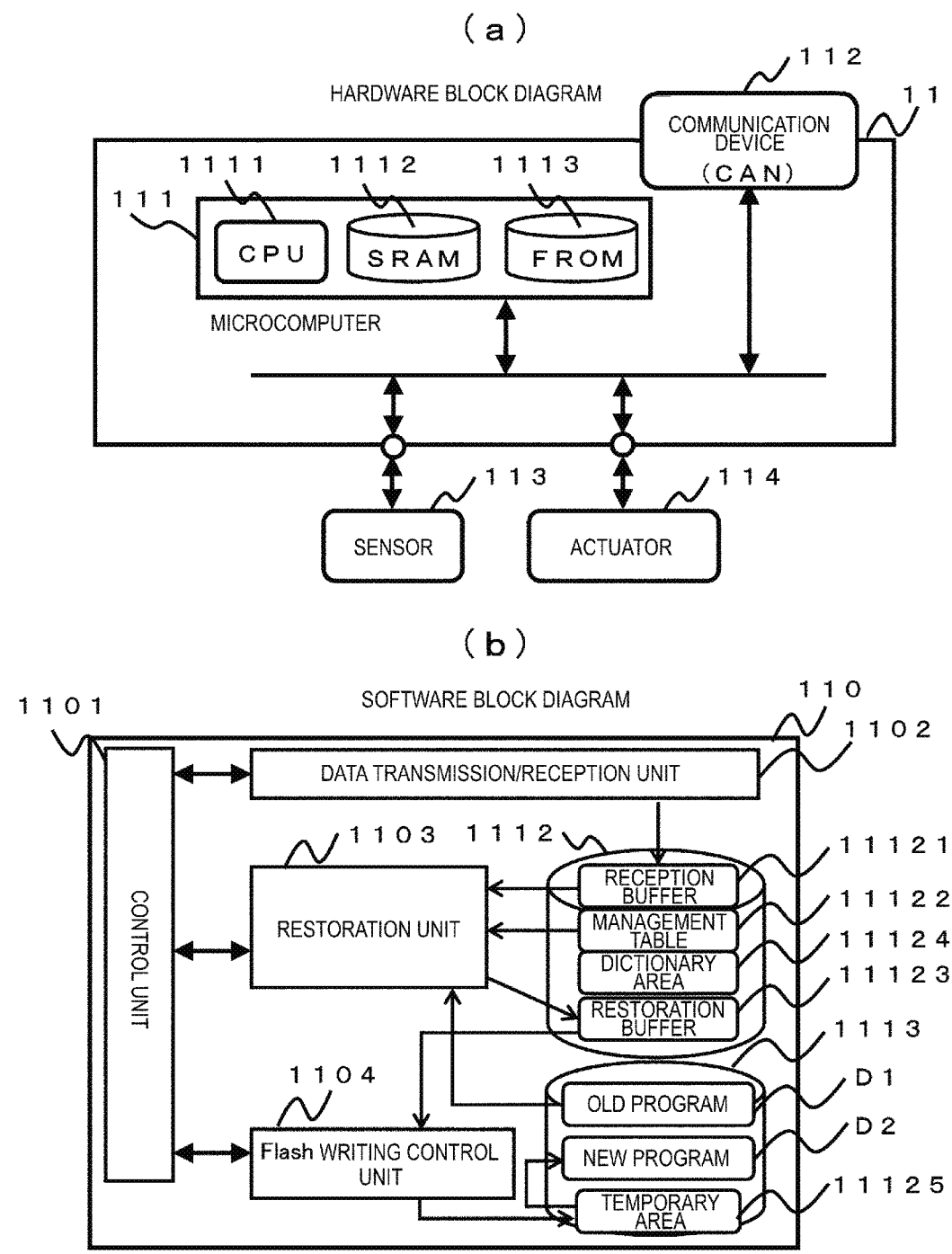

[FIG. 4]
(a)
HARDWARE BLOCK DIAGRAM
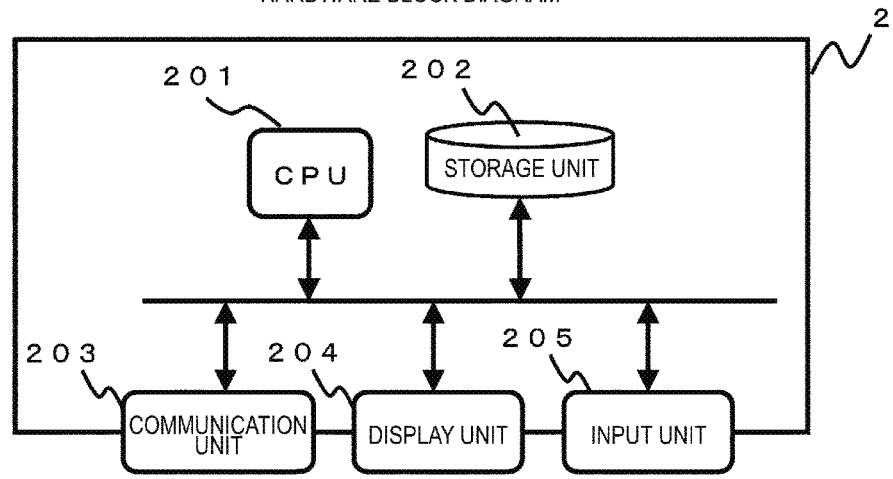
(b)
SOFTWARE BLOCK DIAGRAM
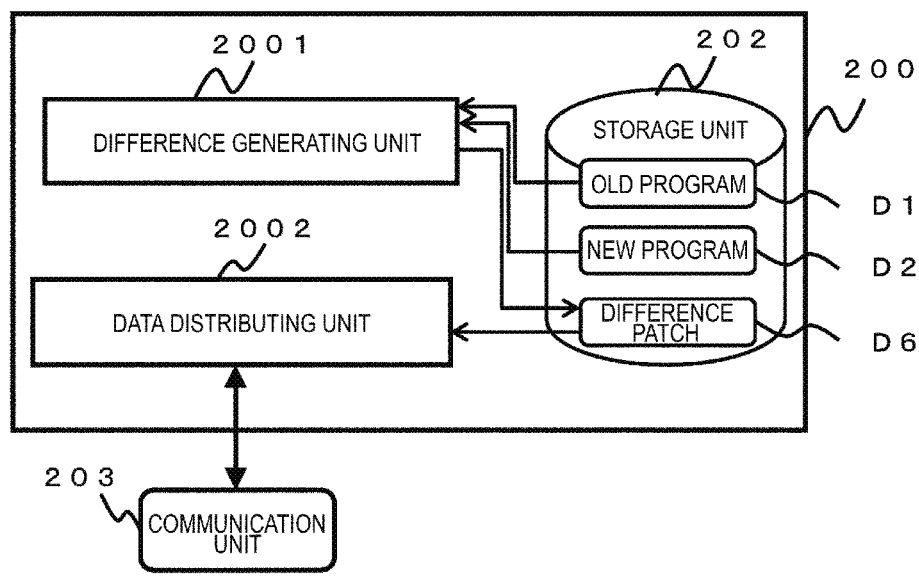

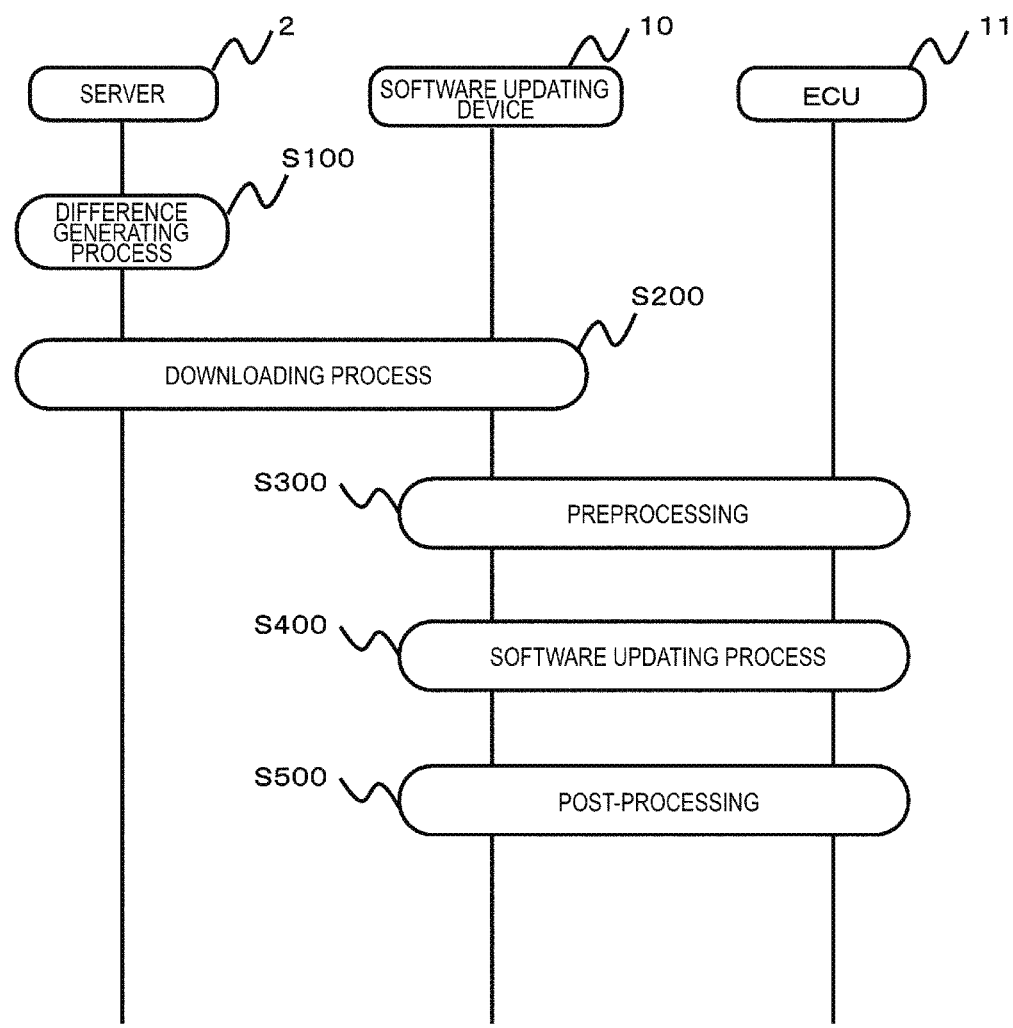
[FIG. 5]

[FIG. 6]
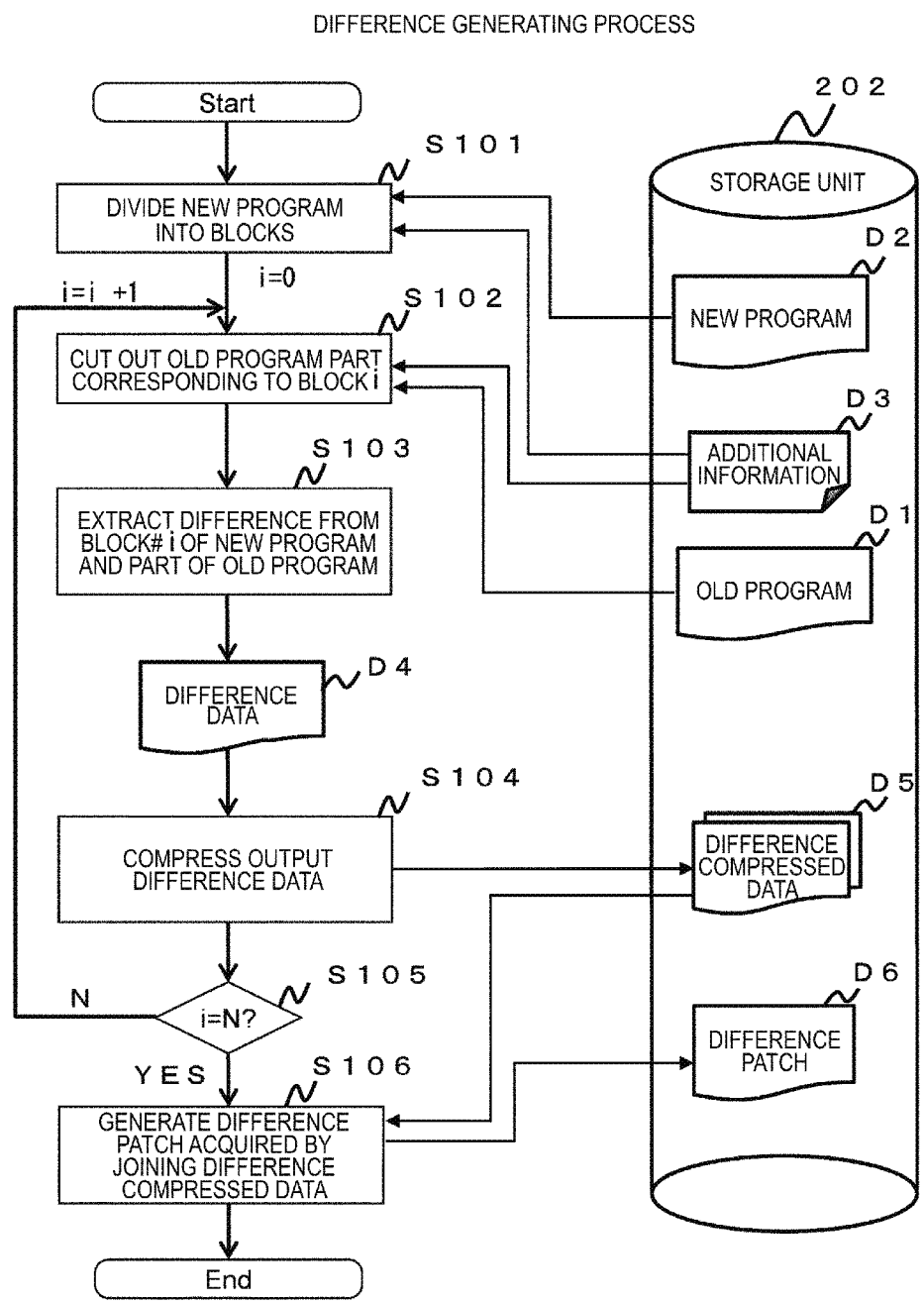

[FIG. 7]
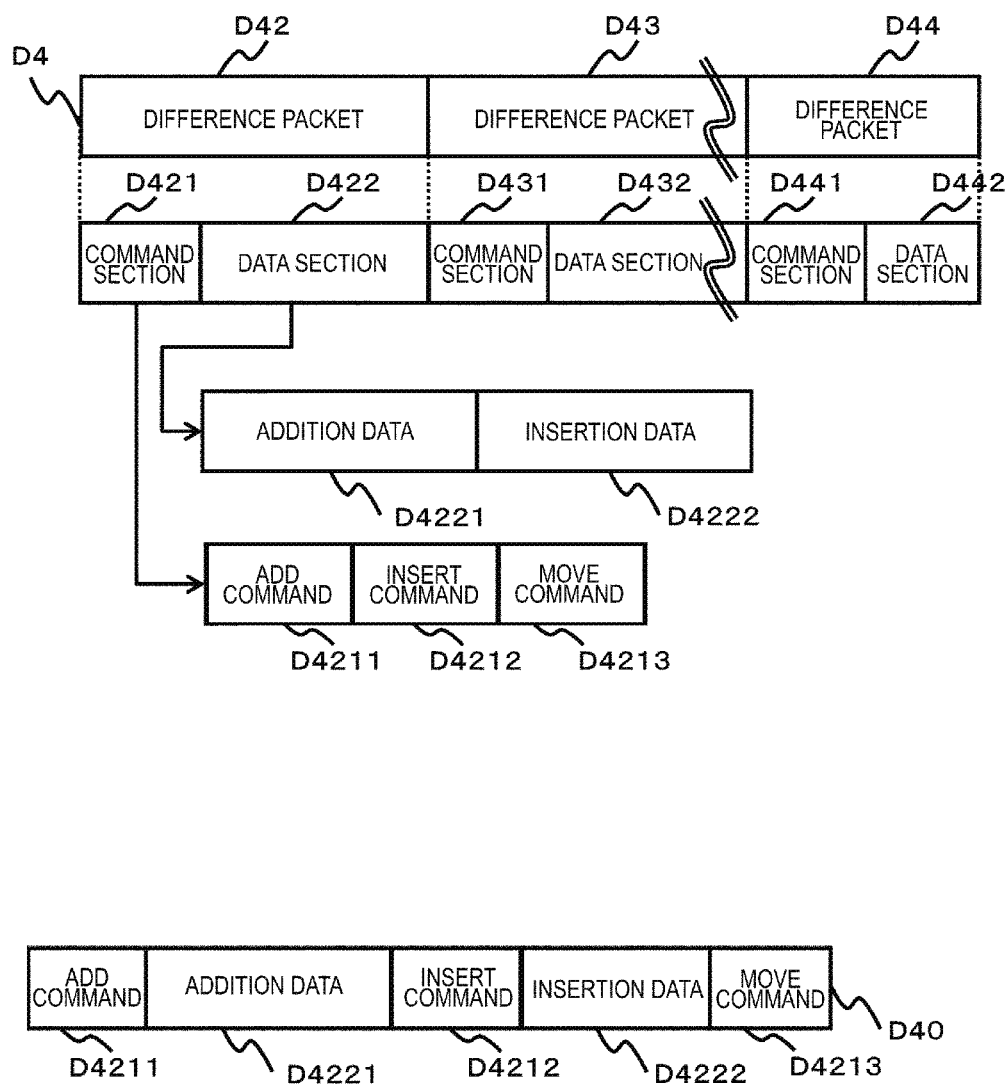

[FIG. 8]
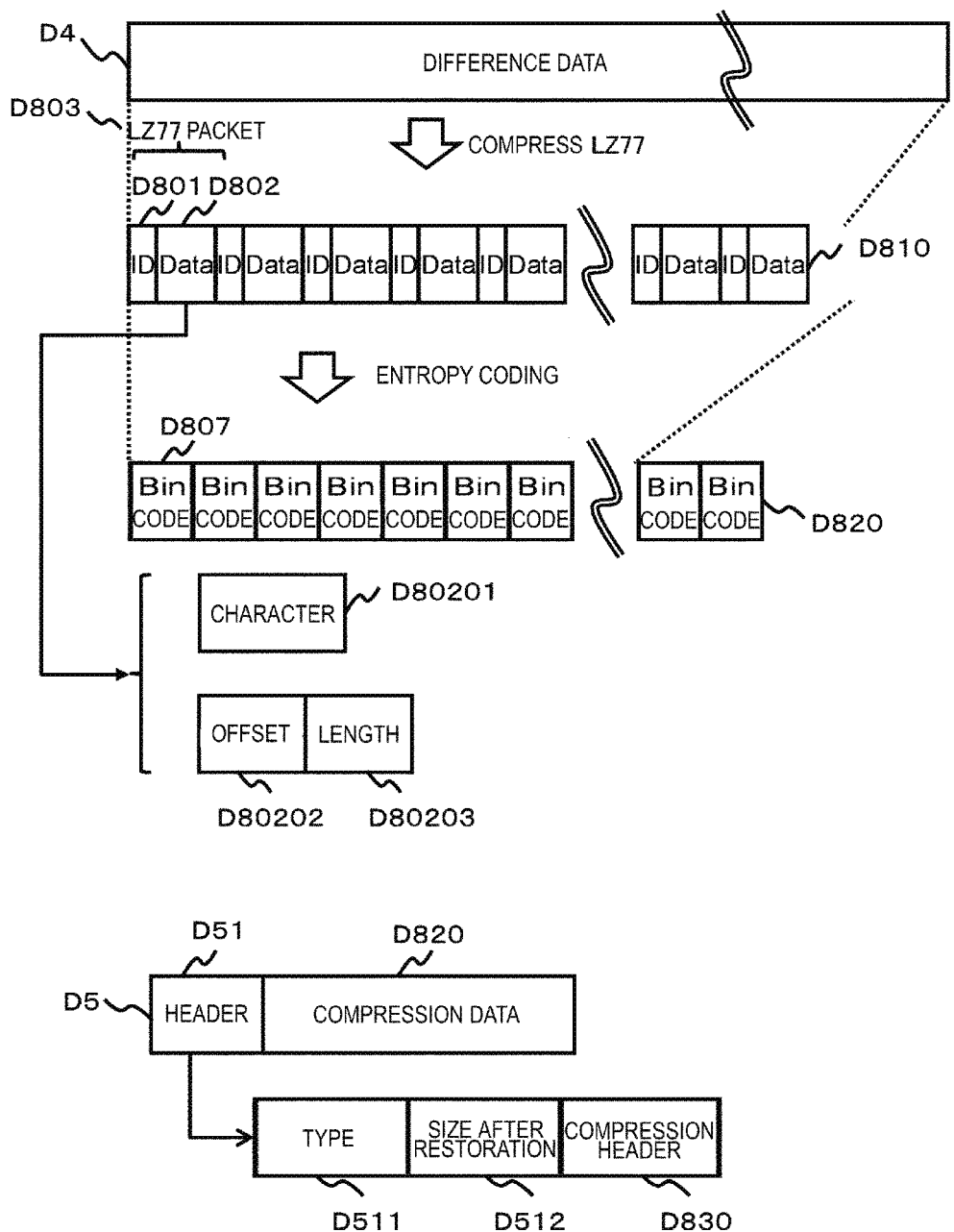

[FIG. 9]
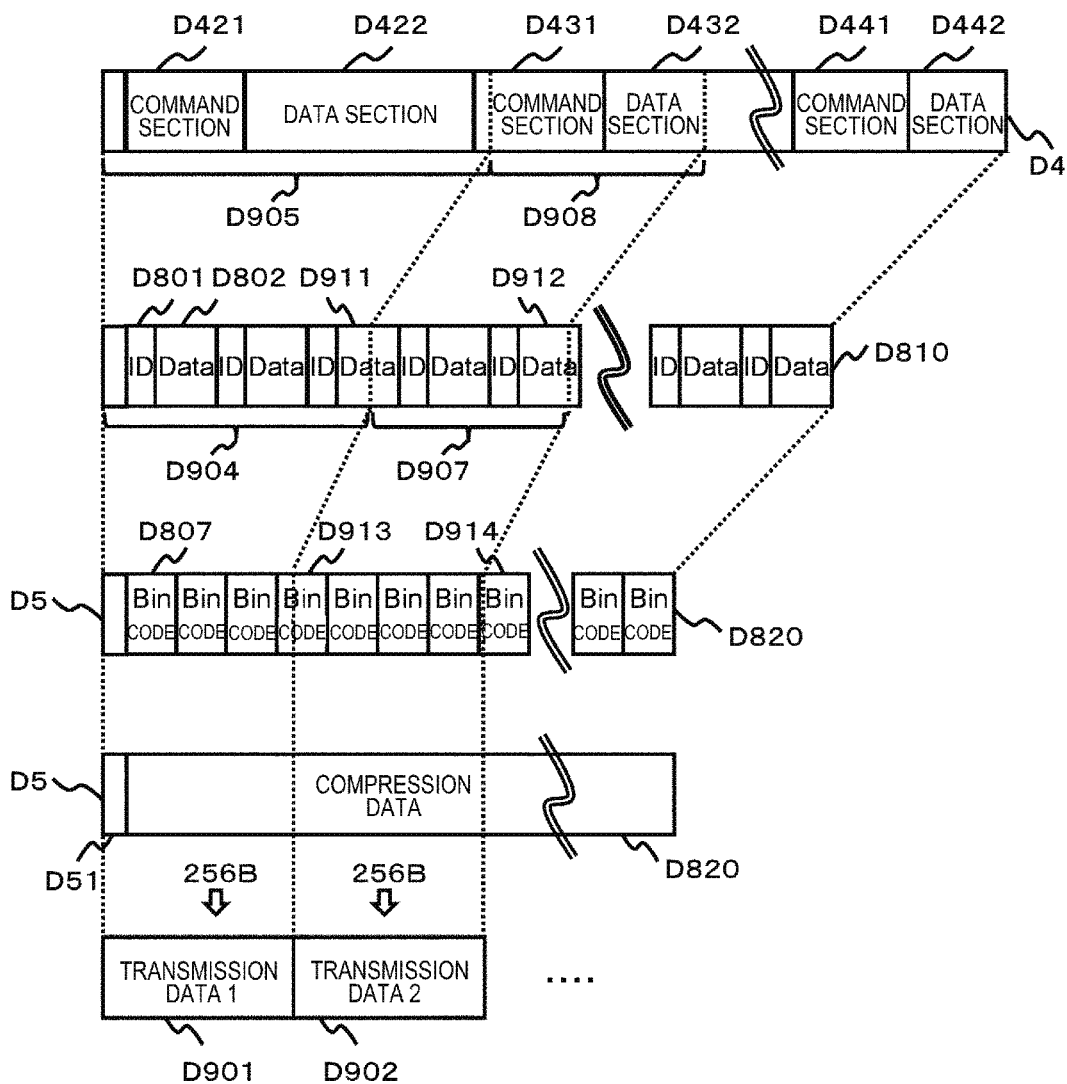

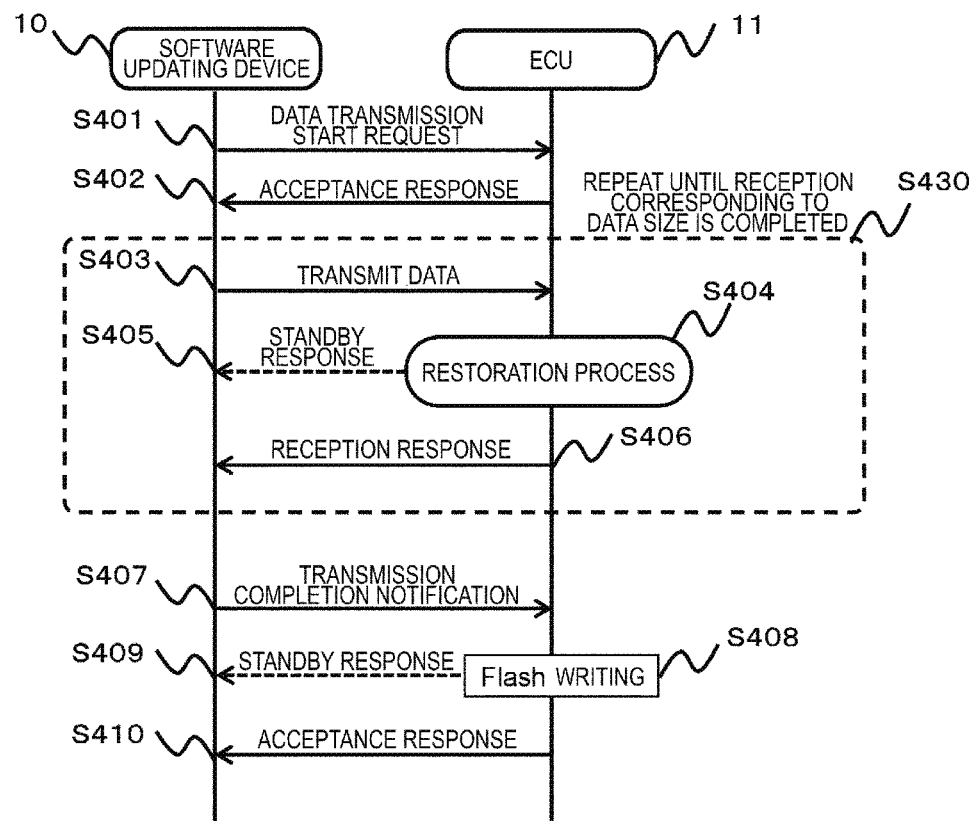
[FIG. 10]

[FIG. 11]
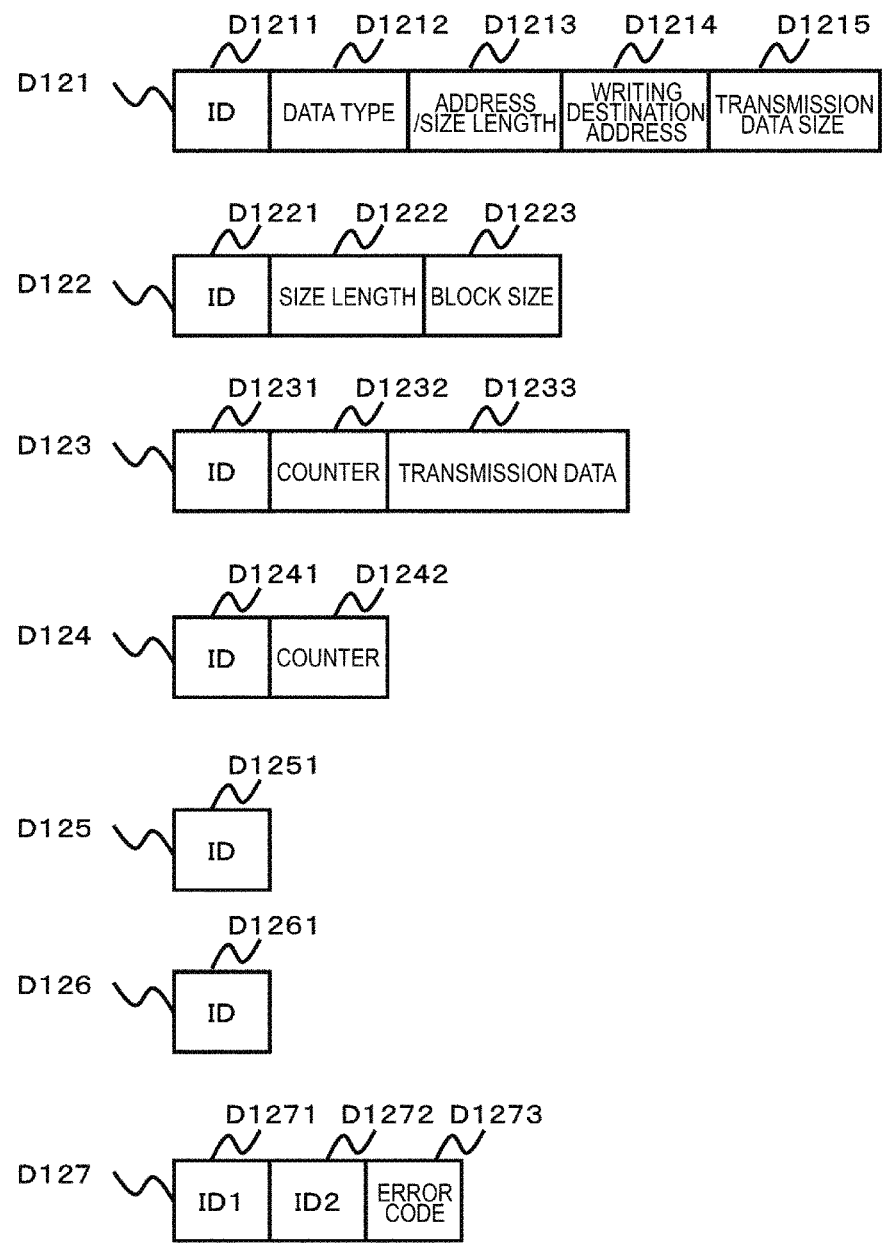

[FIG. 12]

MANAGEMENT TABLE 11122

| | ITEM | VALUE | |
|---|---|---|---|
| T60 DIFFERENCE RESTORATION STATE | SIZE AFTER RESTORATION | 33555532 | T601 |
| | RESTORATION-COMPLETED SIZE | 13239439 | T602 |
| | RESTORATION TARGET | ADDITION DATA | T603 |
| | OUTPUT DESTINATION BUFFER ADDRESS | 0x0033dfef | T604 |
| | SIZE OF DATA SECTION UNDER PROCESSING | 6144 | T605 |
| | CURRENT PROCESSING POSITION | 4326 | T606 |
| | HALFWAY COMMAND | 0x0202 | T607 |
| | COMMAND | 0x000023 | T608 |
| T61 COMPRESSED /DECOMPRESSED STATE | SIZE AFTER DECOMPRESSION | 33554672 | T611 |
| | DECOMPRESSION-COMPLETED SIZE | 12334434 | T612 |
| | DATA UNDER DECOMPRESSING | 00FE3D | T613 |

[FIG. 13]
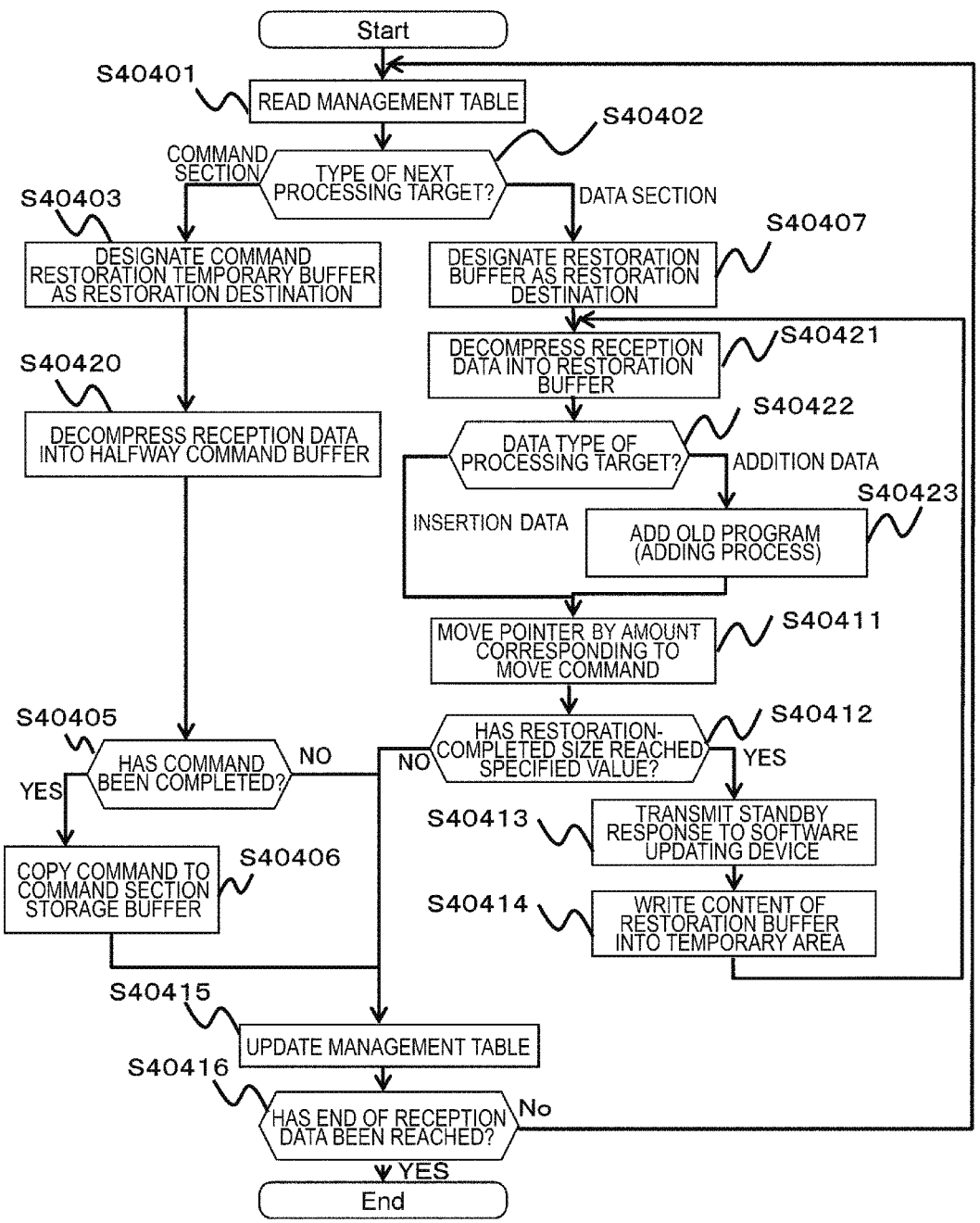

[FIG. 14]
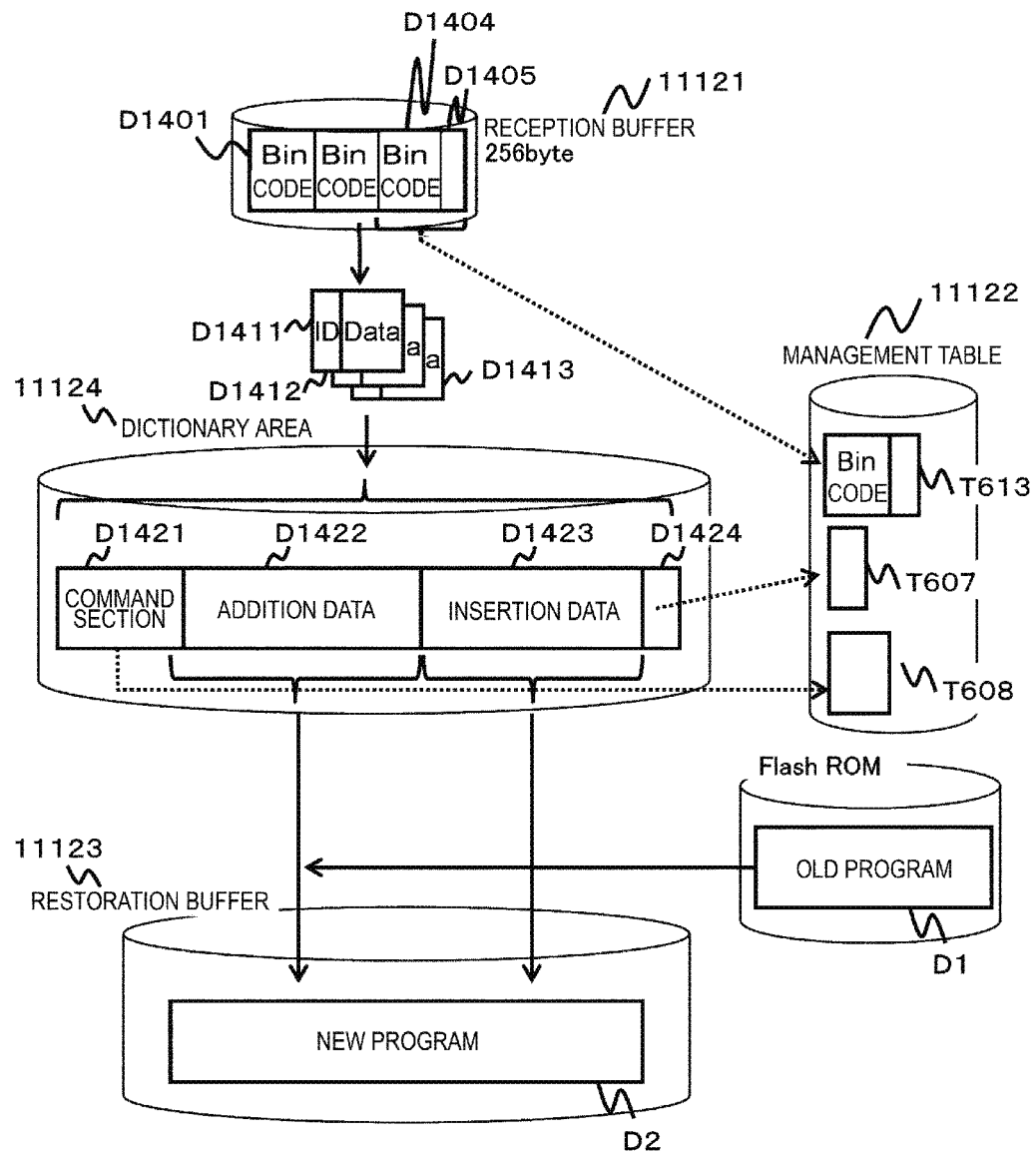

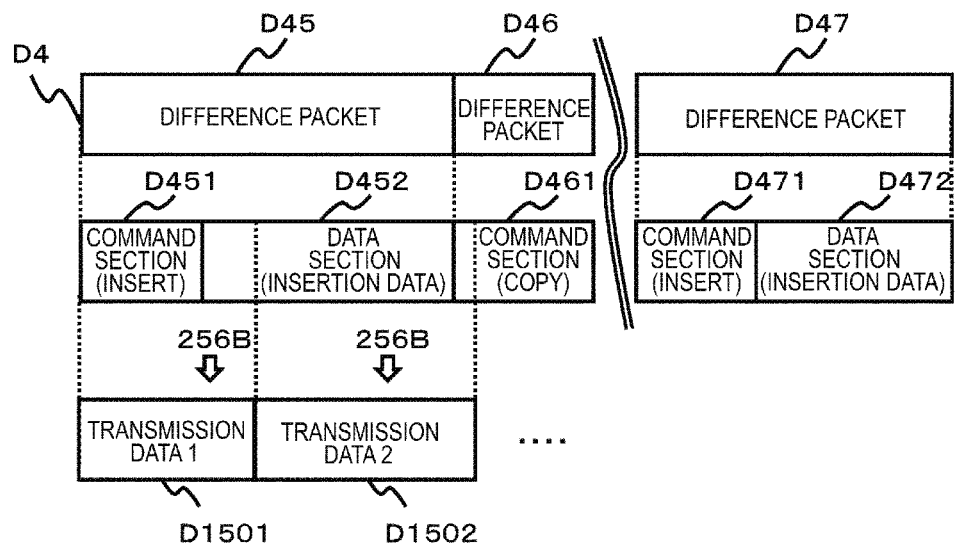
[FIG. 15]

[FIG. 16]
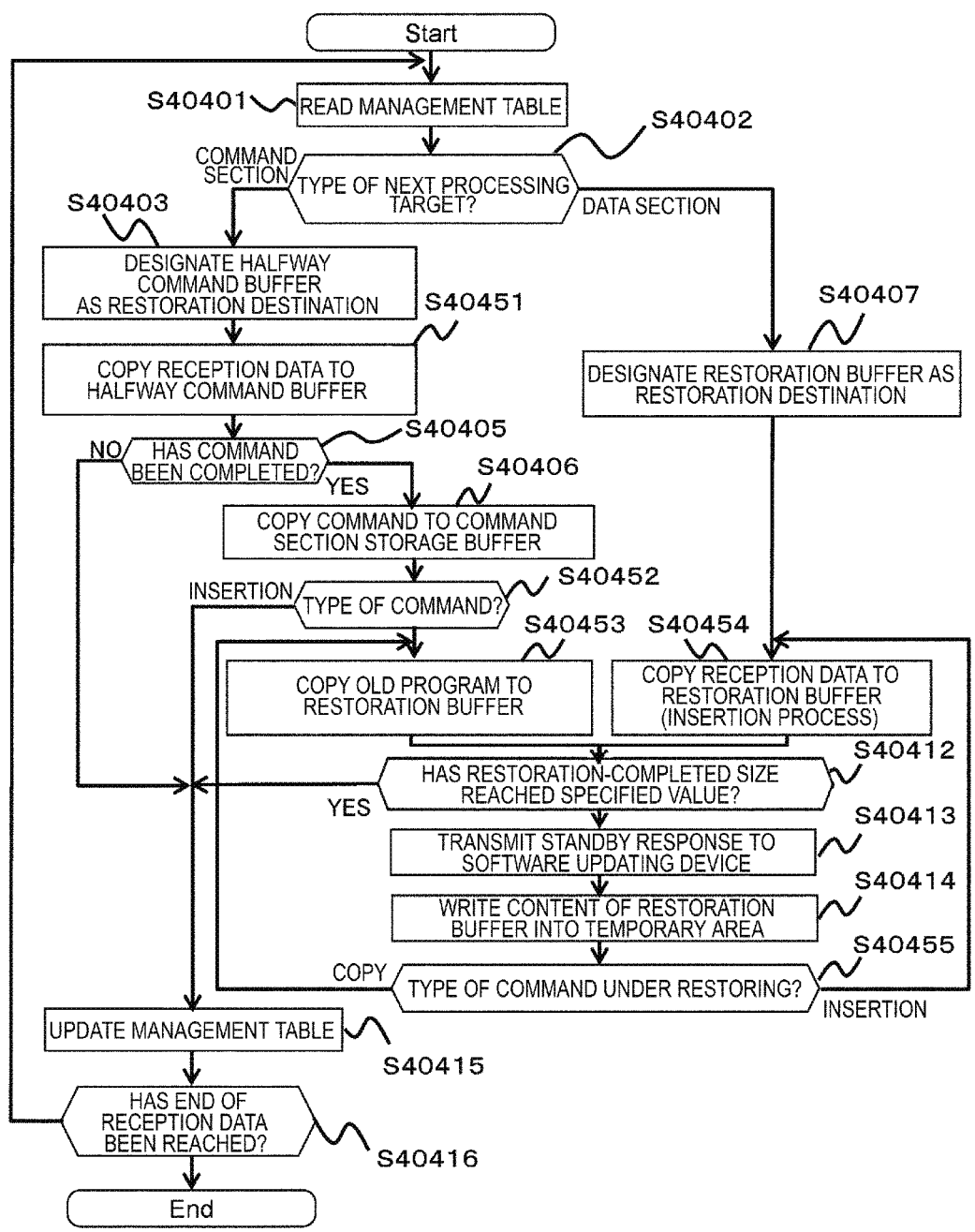

[FIG. 17]
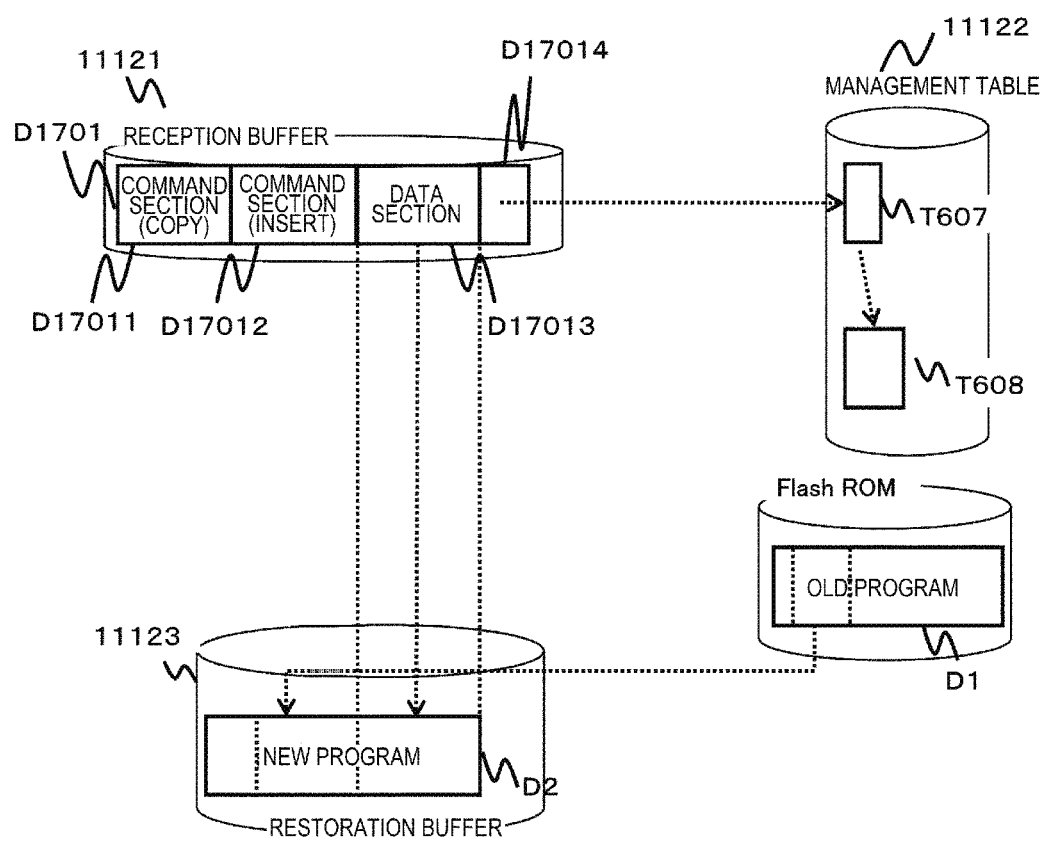

ELECTRIC CONTROL DEVICE FOR VEHICLES, PROGRAM UPDATING METHOD, AND SERVER APPARATUS

TECHNICAL FIELD

The present invention relates to an electric control device for vehicles, a program updating method, and a server apparatus.

BACKGROUND ART

In recent years, the scale of software mounted in an electric control device (electric control unit (ECU)) for vehicles increases in accordance with progresses of a driving support function and automatic driving technologies. Accordingly, the number of times of recall due to inconvenience of software and the scale of the number of vehicles that are necessary to respond to one time of recall increase. In addition, in accordance with progresses of communication networks, signs of wide use of connected cars enabling automatic vehicles to be wirelessly connected to a center system or the like are shown. In such situations, there are increasing requests for vehicle-dedicated remote software updating technologies for remotely updating ECU software of vehicles by applying a wireless remote software updating technology conventionally used in cellular phones and television sets to the vehicles.

Relating to the remote software updating technologies described above, for example, in PTL 1, for example, an over the air (OTA) technology used for updating a program of a mobile terminal through a difference update has been disclosed in PTL1. In the technology disclosed in PTL 1, differences between programs before and after an update are downloaded into a reception device and are stored in a memory together with the program before the update, and the program of the reception device is updated using such information.

CITATION LIST

Patent Literature

PTL 1: JP-A-2012-69131

SUMMARY OF INVENTION

Technical Problem

In the technology disclosed in PTL 1, all the differences between programs before and after an update need to be downloaded and stored in a memory of the reception device. However, generally, an electric control device for vehicles has a small memory capacity and cannot sufficiently secure a memory area for updating a program. For this reason, it is difficult to apply the difference update disclosed in PTL1 to an update of a program of an electric control device for vehicles.

Solution to Problem

According to the present invention, an electric control device for vehicles capable of updating an old program with a new program includes: a storage unit that stores the old program; a reception unit that sequentially receives a plurality of pieces of division data acquired by dividing difference data, which includes a data section based on a difference between the old program and the new program and a command section used for generating the new program by reflecting the data section on the old program, or difference compression data acquired by compressing the difference data, for every predetermined data length; and a restoration unit that executes a restoration process for restoring the new program based on each division data received by the reception unit and the old program, wherein, in a case in which at least a part of the command section and the data section is not included in the division data received by the reception unit, the restoration unit suspends the restoration process and waits for reception of next division data.

According to the present invention, a program updating method for updating an old program stored in a storage unit of an electric control device with a new program includes: sequentially receiving a plurality of pieces of division data acquired by dividing difference data, which includes a data section based on a difference between the old program and the new program and a command section used for generating the new program by reflecting the data section on the old program, or difference compression data acquired by compressing the difference data, for every predetermined data length using the electric control device; and executing a restoration process for restoring the new program based on each received division data and the old program using the electric control device; and suspending the restoration process using the electric control device and waiting for reception of next division data in a case in which at least a part of the command section and the data section is not included in the received division data.

According to the present invention, a server apparatus providing data used for updating an old program of an electric control device with a new program includes: a difference generating unit that generates a difference patch by joining a plurality of pieces of difference data, which includes a data section based on a difference between the old program and the new program and a command section used for generating the new program by reflecting the data section on the old program, or difference compression data acquired by compressing the difference data; and a data distributing unit that distributes the difference patch generated by the difference generating unit.

Advantageous Effects of Invention

According to the present invention, a difference update can be applied to an update of a program of an electric control device for vehicles.

BRIEF DESCRIPTION OF DRAWINGS

FIG. 1 is a block diagram illustrating an example of the configuration of a software updating system according to one embodiment of the present invention.

FIG. 2 is a block diagram illustrating an example of the hardware configuration and an example of the software configuration of a software updating device.

FIG. 3 is a block diagram illustrating an example of the hardware configuration and an example of the software configuration of an ECU.

FIG. 4 is a block diagram illustrating an example of the hardware configuration and an example of the software configuration of a server.

FIG. 5 is a sequence diagram illustrating the flow of a program update in a software updating system according to one embodiment of the present invention.

FIG. 6 is a flowchart illustrating the flow of a difference generating process.

FIG. 7 is a diagram illustrating an example of the configuration of difference data.

FIG. 8 is a diagram illustrating an example of the configuration of a difference compression data.

FIG. 9 is a diagram illustrating an example of the configuration of division data according to a first embodiment of the present invention.

FIG. 10 is a sequence diagram illustrating the flow of a software updating process.

FIG. 11 is a diagram illustrating an example of the configuration of commands exchanged between a software updating device and an ECU.

FIG. 12 is a diagram illustrating the configuration of a management table according to the first embodiment of the present invention.

FIG. 13 is a flowchart illustrating a restoration process according to the first embodiment of the present invention.

FIG. 14 is a diagram illustrating an overview of the flow of data in a restoration process according to the first embodiment of the present invention.

FIG. 15 is a diagram illustrating an example of the configurations of division data and a management table according to a second embodiment of the present invention.

FIG. 16 is a flowchart illustrating a restoration process according to the second embodiment of the present invention.

FIG. 17 is a diagram illustrating an overview of the flow of data in a restoration process according to the second embodiment of the present invention.

DESCRIPTION OF EMBODIMENTS

First Embodiment

Hereinafter, a first embodiment of the present invention will be described with reference to the drawings. The present invention is not limited to embodiments described below. In the embodiments described below, a case in which the present invention is applied to an update of a program of an ECU for vehicles will be described. However, the present invention can be applied to an update of overall control information such as various parameters and data other than a program used in an ECU. In addition, the present invention can be applied to an update of a program or control information in an electric control device other than an ECU for vehicles.
<System Configuration>

FIG. 1 is a block diagram illustrating an example of the configuration of a software updating system according to one embodiment of the present invention. As illustrated in FIG. 1, the software updating system according to this embodiment includes a software updating device 10, electric control units (ECUs) 11, 12, and 13, and a server 2 connected to the software updating device 10 through the Internet 3 and an access network 4, with the device and the ECUs being mounted in the vehicle 1. The access network 4 is a radio communication network provided by a communication service provider and is used to connect the software updating device 10 with the Internet 3.

In the vehicle 1, the software updating device 10 and the ECUs 11, 12, and 13 are interconnected using an in-vehicle network 14. The in-vehicle network 14 is a communication network disposed inside the vehicle 1 and, for example, is configured by a controller area network (CAN) (registered trademark), a local interconnect network (LIN), FlexRay, Ethernet (registered trademark), or the like. Hereinafter, while the in-vehicle network 14 will be described as being configured by the CAN, the description similarly applies also to a case of a different communication form.

The software updating device 10 is connected to the server 2 through the Internet 3 and the access network 4 and downloads a difference patch D6 that is data required for updating programs of the ECUs 11, 12, and 13 from the server 2. The software updating device 10 transmits the difference patch D6 downloaded from the server 2 to an ECU designated as a program updating target among the ECUs 11, 12, and 13 through the in-vehicle network 14. In addition, the software updating device 10 may download data required for an own program update from the server 2 and perform its own program update using the data.

The ECUs 11, 12, and 13 are disposed respectively in correspondence with various in-vehicle devices mounted in the vehicle 1 and perform respectively control required for realizing functions of the vehicle 1 such as driving. In FIG. 1, although only the ECUs 11, 12, and 13 are illustrated, many other ECUs are mounted in the vehicle 1. However, hereinafter, for easy understanding of the description, the ECUs 11, 12, and 13 will be described as representative examples. Although not illustrated in FIG. 1, constituent elements inside the vehicle 1 such as the software updating device 10 and the ECUs 11, 12, and 13 are respectively assumed to be connected to a storage battery using power lines and receive supply of power from the storage battery.

In the software updating system according to this embodiment of which the configuration is illustrated in FIG. 1, a difference patch D6 required for program updates of the ECUs 11, 12, and 13 is distributed from the server 2 to the ECUs 11, 12, and 13 through the software updating device 10. Processes to be described later are executed in the ECUs 11, 12, and 13 respectively based on the difference patch D6, new programs are applied to the ECUs 11, 12, and 13.

In this embodiment, as a network protocol of the Internet 3 and the access network 4, for example, an Internet protocol (IP) may be used. In addition, as a higher-rank transport protocol, for example, a user datagram protocol (UDP) or a transmission control protocol (TCP) may be used. While there are IPv4 and IPv6 in the IP as difference versions, any one thereof may be used in this embodiment.
<Configuration of Software Updating Device>

FIG. 2 is a block diagram illustrating an example of the hardware configuration and an example of the software configuration of the software updating device 10. A hardware block diagram illustrated in FIG. 2(a) illustrates an example of the hardware configuration of the software updating device 10. As illustrated in FIG. 2(a), the software updating device 10 includes a microcomputer 101, a communication device (CAN) 102, a communication device (wide area network (WAN)) 103, and an FROM 104.

The microcomputer 101 includes a central processing unit (CPU) 1011, an SRAM 1012, and an FROM 1013. The CPU 1011 executes a control program stored in the FROM 1013 using the SRAM 1012 as a work area, thereby causing the software updating device 10 to function. The CPU 1011, for example, performs control of other constituent elements inside the software updating device 10, instructs the communication device (CAN) 102 to perform transmission/reception of data to/from another device connected to the software updating device 10 through the in-vehicle network 14, or instructs the communication device (WAN) 103 to transmit/receive data to/from the server 2 connected to the software updating device 10 through the internet 3 and the access network 4. The FROM 1013 stores control information for operating the software updating device 10 such as a control program, required parameters, and the like. The SRAM 1012 temporarily stores a part of a control program, data required for an operation of the control program, and the like in accordance with a computation process of the CPU 1011.

The FROM 104 is configured by a nonvolatile memory (read only memory (ROM)) and stores the difference patch D6 distributed from the server 1and a new program of the software updating device 10. In addition, for example, the FROM 104 maintains data such as information of devices connected to the software updating device 10 in accordance with an instruction from the microcomputer 101.

The communication device (WAN) 103 transmits/receives data to/from the server 2 connected through the Internet 3 and the access network 4 in accordance with an instruction from the microcomputer 101. The communication device (WAN) 103, for example, is configured by a wired communication unit such as Ethernet or a radio communication unit such as 3G, WiMAX (registered trademark), or long term evolution (LTE).

The communication device (CAN) 102 transmits/receives data to/from the ECUs 11, 12, and 13 connected through the in-vehicle network 14 in accordance with an instruction from the microcomputer 101.

The software block diagram illustrated in FIG. 2(b) illustrates an example of the configuration of a control program 100 operating on the software updating device 10. The control program 100 used for realizing the function of the software updating device 10 is deployed on the FROM 1013 or the SRAM 1012 of FIG. 2(a) to be executed by the CPU 1011. The control program 100, as illustrated in FIG. 2(b), is configured by an update control unit 1001, a data transmitting/receiving unit (CAN) 1002, and a data transmitting/receiving unit (WAN) 1003. In the FROM 104, the difference patch D6 is maintained. In the example illustrated in FIG. 2(b), although the control program 100 is divided into blocks of the update control unit 1001, the data transmitting/receiving unit (CAN) 1002, and the data transmitting/receiving unit (WAN) 1003 based on the functions thereof, each of such blocks may be further divided, or two or more blocks thereof may be integrated. In addition, the control program 100 does not need to be realized by one program but may be realized by a combination of two or more programs.

The update control unit 1001 acquires the difference patch D6 from the server 2 through the data transmitting/receiving unit (WAN) 1003 or transmits the state of the vehicle 1 and statuses of software updating processes in the ECUs 11, 12, and 13 to the server 2. In addition, the update control unit 1001 acquires states of constituent elements other than the software updating device 10 mounted in the vehicle 1 through the data transmitting/receiving unit (CAN) 1002 and performs a software updating process of the software updating device 10 in accordance with the states. In addition, the update control unit 1001 generates division data used for updating the program of the ECU that is an update target among the ECUs 11, 12, and 13 by dividing the difference patch D6 distributed from the server 2 for every predetermined data length and sequentially transmits the division data to the ECU. Thereafter, when the update of the program for the ECU that is an update target ends, state checking after the update is performed.

By operating the communication device (WAN) 103 in accordance with an instruction from the update control unit 1001, the data transmitting/receiving unit (WAN) 1003 transmits/receives data to/from the server 2 through the access network 4 and the Internet 3. In addition, the data transmitting receiving unit (WAN) 1003 may have a function of analyzing and configuring packets of TCP/IP, UDP/IP, or the like.

By operating the communication device (CAN) 102 in accordance with an instruction from the update control unit 1001, the communication device (CAN) 102 transmits/receives data to/from devices other than the software updating device 10 mounted in the vehicle 1 through the in-vehicle network 14.

<Configuration of ECU>

FIG. 3 is a block diagram illustrating an example of the hardware configuration and an example of the software configuration of the ECU 11. The hardware block diagram illustrated in FIG. 3(a) illustrates an example of the hardware configuration of the ECU 11. As illustrated in FIG. 3(a), the ECU 11 includes a microcomputer 111 and a communication device (CAN) 112 and is connected to a sensor 113 and an actuator 114. While FIG. 3(a) illustrates the hardware block diagram of the ECU 11, each of the ECUs 12 and 13 has the same configuration as that of the ECU 11.

The microcomputer 111 includes a CPU 1111, an SRAM 1112, and a FROM 1113. The CPU 1111 operates the ECU 11 by executing a control program stored in the FROM 1113 using the SRAM 1112 as a work area, whereby a part of the function of the vehicle 1 is realized. The CPU 1111, for example, performs reading of the sensor 113 or an operation of the actuator 114 or transmits/receives data to/from other devices connected to the in-vehicle network 14 through the communication device (CAN) 112.

The sensor 113 acquires data required for controlling the vehicle 1 in accordance with an instruction from the microcomputer 111. The actuator 114 drives constituent elements required for controlling the vehicle 1, for example, a brake and the like in accordance with an instruction from the microcomputer 111.

The functions of the SRAM 1112, the FROM 1113, and the communication device (CAN) 112 are respectively similar to the SRAM 1012, the FROM 1013, and the communication device (CAN) 102 of the software updating device 10, and thus, description thereof will not be presented.

The software block diagram illustrated in FIG. 3(b) illustrates an example of the configuration of the control program 110 operating on the ECU 11. The control program 110 for realizing the function of the ECU 11 is deployed on the FROM 1013 or in the SRAM 1112 illustrated in FIG. 3(a) and is executed by the CPU 1111 and, as illustrated in FIG. 3(b), is configured by a control unit 1101, a data transmitting/receiving unit 1102, a restoration unit 1103, and a flash writing control unit 1104. In addition, in the SRAM 1112, a reception buffer 11121, a restoration buffer 11123, a management table 11122, and a dictionary area 11124 are maintained. The control program 110 rewrites an old program D1 maintained in the FROM 1113 into a new program D2 based on division data of the difference patch D6 that is received from the software updating device 10 and is stored in the reception buffer 11121. When this program is rewritten, a temporary area 11125 that is a storage area other than an area of the FROM 1113 in which the old program D1 is stored is used by the flash writing control unit 1104. In the example illustrated in FIG. 3(b), although the control program 110 is divided into blocks of the control unit 1101, the data transmitting/receiving unit 1102, the restoration unit 1103, and the flash writing control unit 1104 based on the functions thereof, each of such blocks may be further divided, or two or more blocks thereof may be integrated. In addition, the control program 110 does not need to be realized by one program but may be realized by a combination of two or more programs.

The control unit 1101 performs reading data from the sensor 113 or an operation of the actuator 114. In addition, the control unit 1101 transmits/receives data to/from devices other than the ECU 11 connected to the in-vehicle network 14 through the communication device (CAN) 112. In this way, by operating the ECU 11, a part of the function required for the vehicle 1 is realized. In addition, the control unit 1101 updates the old program D1 with the new program D2 by controlling the data transmitting/receiving unit 1102, the restoration unit 1103, and the flash writing control unit 1104, respectively.

The data transmitting/receiving unit 1102 operates the communication device (CAN) 112 in accordance with an instruction from the control unit 1101 and transmits/receives data to/from devices other than the ECU 11 through the in-vehicle network 14.

The restoration unit 1103 restores a part of the new program D2 and stores the restored part in the restoration buffer 11123 based on the division data of the difference patch D6 that is received from the software updating device 10 and is stored in the reception buffer 11121 and the old program D1 maintained in the FROM 1113.

The flash writing control unit 1104 erases data stored in the FROM 1113 or write data into the FROM 1113 in accordance with an instruction from the control unit 1101. When the old program D1 is updated with the new program D2, the flash writing control unit 1104 copies data stored in the restoration buffer 11123 into the temporary area 11125 of the FROM 1113.

<Configuration of Server>

FIG. 4 is a block diagram illustrating an example of the hardware configuration and an example of the software configuration of the server 2. The hardware block diagram illustrated in FIG. 4(a) illustrates an example of the hardware configuration of the server 2. As illustrated in FIG. 4(a), the server 2 includes a CPU 201, a storage unit 202, a communication unit 203, a display unit 204, and an input unit 205.

The CPU 201 executes a server program stored in the storage unit 202, thereby controlling generation and distribution of the difference patch D6.

The storage unit 202 stores the old program D1 and the new program D2 used for the generation of the difference patch D6 and the generated difference patch D6.

The communication unit 203 transmits/receives data to/from the software updating device 10 mounted in the vehicle 1 through the Internet 3 and the access network 4 in accordance with an instruction from the CPU 201.

The display unit 204 displays information necessary for an operator operating the server 2 in accordance with an instruction from the CPU 201. For example, by displaying information relating to the generation and the distribution of the difference patch D6, such information is provided for an operator of the server 2.

The input unit 205 accepts an input operation from an operator operating the server 2 and outputs input information to the CPU 201 according to the input operation.

The software block diagram illustrated in FIG. 4(b) illustrates an example of the configuration of the server program 200 operating on the server 2. The server program 200 used for realizing the function of the server 2 is executed by the CPU 201 illustrated in FIG. 4(a) and, as illustrated in FIG. 4(b), is configured by a difference generating unit 2001 and a data distributing unit 2002. In the example illustrated in FIG. 4(b), although the server program 200 is divided into blocks of the difference generating unit 2001 and the data distributing unit 2002, based on the functions thereof, each of such blocks may be further divided, or such blocks thereof may be integrated. In addition, the server program 200 does not need to be realized by one program but may be realized by a combination of two or more programs.

The difference generating unit 2001 generates a difference patch D6 based on the old program D1 and the new program D2 stored in the storage unit 202.

The data distributing unit 2002 distributes the difference patch D6 stored in the storage unit 202 to the software updating device 10 mounted in the vehicle 1 through the Internet 3 and the access network 4 by operating the communication unit 203.

The configuration of the server 2 described above may be realized by one server or may be realized by a plurality of servers linked to each other.

<Flow of Program Update>

FIG. 5 is a sequence diagram illustrating the flow of a program update in a software updating system according to one embodiment of the present invention. In the software updating system according to this embodiment, any one of the ECUs 11, 12, and 13 illustrated in FIG. 1 is set as a program update target, and a program update is performed in accordance with the flow illustrated in the sequence diagram of FIG. 5. Hereinafter, although an example of a case in which the ECU 11 is a program update target will be described, description is similar also in a case in which any one of the ECUs 12 and 13 is a program update target.

First, the server 2 performs a difference generating process for generating a difference patch D6 to be distributed to the vehicle 1 based on the old program D1 and the new program D2 in Step S100. Details of this difference generating process will be described later with reference to FIG. 7.

Next, the software updating device 10 performs a downloading process for downloading the difference patch D6 generated in Step S100 from the server 2 in Step S200. This downloading process, for example, is performed when the engine of the vehicle 1 is started or the like. In the downloading process, the difference patch D6 is transmitted from the server 2 to the software updating device 10, whereby the difference patch D6 is downloaded. The downloaded difference patch D6 is maintained in the FROM 104 of the software updating device 10.

Thereafter, the software updating device 10 and the ECU 11 perform pre-processing in Step S300. The pre-processing is performed when the engine of the vehicle 1 transitions from an operation state to a stopped state or the like. In the pre-processing, for example, checking of a version of the old program D1 using the ECU 11, an abnormality analysis of the ECU 11, and the like are performed.

Subsequently, in Step S400, the software updating device 10 and the ECU 11 perform a software updating process for updating the old program D1 of the ECU 11 with the new program D2 using the difference patch D6 downloaded in Step S200. In this software updating process, the difference patch D6 in the software updating device 10 is decomposed into difference compression data D5 of each block, the difference compression data D5 is divided for every predetermined data size, and each division data is sequentially transmitted from the software updating device 10 to the ECU 11. The ECU 11 sequentially receives each division data transmitted from the software updating device 10 and updates the old program D1 with the new program D2 based on the division data. Details of the software updating process performed in Step S400 will be described later with reference to FIG. 11.

Finally, in Step S500, the software updating device 10 and the ECU 11 perform post-processing. In the post-processing, for example, checking whether or not the software updating process of Step S400 has normally been completed, erasing of a flag used in the software updating process, and the like are performed.

By performing the process of Steps S100 to S500 described above, the program update according to this embodiment is completed. An execution timing of Steps S300 to S500 may be other than when the engine of the vehicle 1 stops. For example, immediately after completion of the downloading process of Step S200 or at a predetermined time, the process of Steps S300 to S500 is assumed to be executed.

FIG. 6 is a flowchart illustrating the flow of the difference generating process executed in Step S100 illustrated in FIG. 5. The process illustrated in FIG. 6 is executed by the difference generating unit 2001 illustrated in FIG. 4(b) in the server 2.

First, in Step S101, the difference generating unit 2001 reads the new program D2 and the additional information D3 from the storage unit 202. The additional information D3 is information for generating a difference patch D6 that is appropriate for being used in the software updating process performed in Step S400 illustrated in FIG. 5 based on the new program D2. For example, block information representing a size of a data block transmitted from the software updating device 10 to the ECU 11 and the like are included in the additional information D3. The difference generating unit 2001 divides the new program D2 into a plurality of data blocks based on this additional information D3. When the process of Step S101 is executed, the difference generating unit 2001 sets a value of a block processing counter, which is internally set, as i=0 and then causes the process to proceed to Step S102.

Next, in Step S102, the difference generating unit 2001 selects a block i of the new program D2 that is a data block corresponding to the current value of the block processing counter among a plurality of data blocks divided from the new program D2 in Step S101 and cuts out a part corresponding to this block i from the old program D1. At this time, the difference generating unit 2001 specifies a part of the old program D1 that corresponds to the block i by referring to the additional information D3. At this time, a corresponding block of the old program D1 may be not only a block of the same address as that of a target block of the new program D2 but may be configured by a plurality of blocks.

Next, in Step S103, the difference generating unit 2001 compares the block i of the new program D2 selected in Step S102 with the part cut out from the old program D1 in Step S102 and extracts difference data D4 based on a result of the comparison. In this difference data D4, data that is not present in the old program D1 but is present in the new program D2 and data having the same values on original codes but having different values on execution modules between the old program D1 and the new program D2 are included. In the case of the former data, a data content of the new program D2 is extracted as difference data D4 as it is. On the other hand, in the case of the latter data, a difference value between the old program D1 and the new program D2 is extracted as difference data D4.

Next, in Step S104, the difference generating unit 2001 compresses the difference data D4 extracted in Step S103, thereby generating difference compression data D5. The generated difference compression data D5 is stored in the storage unit 202.

Next, in Step S105, the difference generating unit 2001 checks whether or not extraction of the difference data D4 has been performed up to the last data block by determining whether or not the current value of the block processing counter is set as i=N. Here, N represents the number of data blocks divided from the new program D2 in Step S101, in other words, the number of data blocks from which difference data D4 is to be extracted. As a result, in the case of i=N, it is determined that the extraction of the difference data D4 has been performed up to the last data block, and the process proceeds to Step S106. On the other hand, in a case in which i=N is not satisfied, in other words, in the case of i<N, it is determined that the extraction of the difference data D4 has not performed up to the last data block, one is added to the value of the block processing counter, and the process is returned to Step S102. In this way, the extraction of the difference data D4 is continuously performed for the next data block. The order in which differences are generated may be performed in reverse order from i=N in accordance with a change content of the program.

In Step S106, the difference generating unit 2001 reads the difference compression data D5 generated until now for each data block from the storage unit 202 and sequentially joins the difference compression data, thereby generating a difference patch D6. The generated difference patch D6 is stored in the storage unit 202.

By performing the process of Steps S101 to S106 described above, the difference generating process using the difference generating unit 2001 is completed.

<Data Configuration>

FIG. 7 is a diagram illustrating an example of the configuration of the difference data D4 generated in Step S103 illustrated in FIG. 6. As illustrated in FIG. 7, the difference data D4 is configured by a plurality of difference packets D42, D43, D44, and the like. Although only the difference packets D42, D43, and D44 are illustrated in FIG. 7, many difference packets other than those are included in the difference data D4 as well.

The difference packet D42 is configured by a command section D421 and a data section D422. Similarly, the difference packet D43 is configured by a command section D431 and a data section D432, and the difference packet D44 is configured by a command section D441 and a data section D442. Similarly, any other difference packet is configured by a command section and a data section.

The command section D421 is data used for generating a new program D2 by reflecting the data section D422 on the old program D1 and is configured by an add command D4211, an insert command D4212, and a move command D4213. The data section D422 is data based on a difference between the old program D1 and the new program D2 and is configured by addition data D4221 and insertion data D4222.

The add command D4211 is data representing a command for generating a part of the new program D2 by adding a value of the addition data D4221 to a part of the old program D1. The insert command D4212 is data representing a command for generating a part of the new program D2 by inserting a value of the insertion data D4222 into a part of the old program D1. The move command D4213 is data representing a command for moving a pointer of the new program D2 by an amount corresponding to the data that has been added or inserted in accordance with the add command D4211 or the insert command D4212.

In the description presented above, while the configuration of the command section D421 and the data section D422 configuring the difference packet D42 has been described, command sections D431 and D441 and data sections D432 and D442 respectively configuring the difference packets D43 and D44 have similar configurations respectively. This similarly applies also to any other difference packet.

In this way, the difference packets D42, D43, and D44 are respectively configured from the command sections D421, D431, and D441 and the data sections D422, D432, and D442 following the command sections. In the difference data D4, in addition to the difference packets D42, D43, and D44, a plurality of difference packets having such a structure are arranged. The data arrangement of each difference packet in the difference data D4 does not need to be arranged in the order described above, and, for example, a data arrangement of a difference packet D40 may be employed. In the difference packet D40, each data is arranged in order of an add command D4211, addition data D4221, an insert command D4212, insertion data D4222, and a move command D4213. In addition, in the difference packet D42, the arrangement order of the command section D421 and the data section D422 may be reversed. This similarly applies to any other difference packet. Other than that, the data arrangement of each difference packet may be arbitrarily set.

FIG. 8 is a diagram illustrating an example of the configuration of the difference compression data D5 generated in Step S104 illustrated in FIG. 6. In this embodiment, the difference compression data D5 is generated by performing compression of two steps including LZ77 coding and entropy coding for the difference data D4.

When the difference data D4 is coded using a known LZ77 algorithm, LZ77 compression data D810 configured by a plurality of LZ77 packets D803 is generated. Each LZ77 packet D803 is configured by an ID (packet type) D801 and data D802. Here, in the data section D802, one of a character D80201 and a combination of an offset D80202 for a character string that has appeared in advance and a length D80203 is set. An ID (packet type) D801 is data representing one thereof as a content of the data D802 and is set in accordance with corresponding data D802.

When the LZ77 compression data D810 is entropy-coded using an algorithm such as a range coder or Huffman coding, entropy compression data D820 configured by a plurality of binary codes D807 is generated. In this embodiment, a header section D51 is added to this entropy compression data D820, whereby the difference compression data D5 is configured. The header section D51 is configured by a type D511, a size after restoration D512, and a compression header D830. The type D511 is identification information representing a type of the compression data in the difference compression data D5. In this embodiment, a value corresponding to the entropy compression data D820 is set in the type D511. In addition, in a case in which uncompressed data or data compressed using a different compression method is used, a value different from the entropy compression data D820 is set in the type D511. The size after restoration D512 represents a data size of the entropy compressed data D820 after restoration. The compression header D830 represents a parameter and the like used when the entropy compression data D820 is generated.

In this way, by generating the difference compression data D5 by compressing the difference data D4 and generating the difference patch D6 using the difference compression data D5, the data size of the difference patch D6 can be decreased.

FIG. 9 is a diagram illustrating an example of the configuration of division data according to a first embodiment of the present invention. In this embodiment, as illustrated in FIG. 9, each difference compression data D5 configuring the difference patch D6 is divided for each 256 bytes and is transmitted from the software updating device 10 to the ECU 11 in the software updating process of Step S400 illustrated in FIG. 5 as transmission data D901 and D902 having a fixed length.

The transmission data D901 is division data including a header section D51 of the difference compression data D5 and up to the middle of a binary code D913 of entropy compression data D820. This corresponds to division data D904 including up to middle of data D911 corresponding to a binary code D913 in the LZ77 compression data D810 described with reference to FIG. 8. In addition, this corresponds to division data D905 including the middle of a command section D431 corresponding to data D911 in the difference data D4 described with reference to FIG. 7.

In addition, the transmission data D902 is division data from middle of the binary code D913 of the difference compression data D5 to the middle of a binary code D914. This corresponds to division data D907 from middle of the data D911 corresponding to the binary code D913 to middle of data D912 corresponding to a binary code D914 in the LZ77 compression data D810 described with reference to FIG. 8. In addition, this corresponds to division data D908 from the middle of a command section D431 corresponding to the data D911 to middle of a data section D432 corresponding to the data D912 in the difference data D4 described with reference to FIG. 7.

As described above, by dividing and transmitting the difference compression data D5, the entropy compression data D820, the LZ77 compression data D810, and the difference data D4 configured by a plurality of packets having variable lengths are transmitted with being divided into data having a fixed length respectively. In this way, each binary code configuring the entropy compression data D820, a packet type and data of each LZ77 packet configuring the LZ77 compression data D810, a command section and a data section of each difference packet configuring the difference data D4 are transmitted with being divided at positions corresponding to a data size after division regardless of each data boundary position.

<Flow of Software Updating Process>

FIG. 10 is a sequence diagram illustrating the flow of the software updating process executed between the software updating device 10 and the ECU 11 in Step S400 illustrated in FIG. 5. The sequence diagram illustrated in FIG. 10 illustrates a process executed for one piece of the difference compression data D5 configuring the difference patch D6 transmitted from the server 2 to the software updating device 10 in Step S200. For this reason, in order to update the whole old program D1 of the ECU 11 with the new program D2, the process illustrated in FIG. 10 is repeated for all difference compression data D5 configuring the difference patch D6.

First, in Step S401, the update control unit 1001 of the software updating device 10 transmits a data transmission start request to the ECU 11 through the data transmitting/receiving unit (CAN) 1002. This data transmission start request, for example, includes information of a data format, a data size of data to be transmitted, a recording destination address representing a recording destination of transmitted data, and the like.

When the data transmission start request transmitted by the software updating device 10 in Step S401 is received, the data transmitting/receiving unit 1102 of the ECU 11 transmits an acceptance response to the software updating device 10 in Step S402. This acceptance response includes information of a data size of data that can be received once by the ECU 11 and the like.

When the acceptance response transmitted from the ECU 11 in Step S402 is received, the update control unit 1001 of the software updating device 10 transmits division data acquired by dividing the difference patch D6 to the ECU 11 through the data transmitting/receiving unit (CAN) 1002 in Step S403. At this time, the update control unit 1001 generates a plurality of pieces of division data acquired by dividing the difference patch D6 for every predetermined data length based on the information of the data size included in the acceptance response. Then, the update control unit 1001 sequentially transmits each division data that has been generated from the front side to the ECU 11 one at a time.

When the division data transmitted from the software updating device 10 in Step S403 is received by the data transmitting/receiving unit 1102, the restoration unit 1103 of the ECU 11 performs a restoration process in Step S404. In this restoration process, in a case in which it is determined that it is necessary to perform a process taking time, the restoration unit 1103 appropriately transmits a standby response to the software updating device 10 using the data transmitting/receiving unit 1102 (Step S405). Details of the restoration process will be described later with reference to FIG. 13.

When the restoration process of the division data received in Step S403 ends, the restoration unit 1103 of the ECU 11 transmits a reception response to the software updating device 10 through the data transmitting/receiving unit 1102 in Step S406.

In Step S430, the software updating device 10 and the ECU 11 continue to repeatedly perform a series of processes from S403 to S406 described above until all the division data generated from the difference compression data D5 configuring the difference patch D6 is transmitted.

When a reception response is received from the ECU 11 in Step S406 after all the division data generated from one piece of difference compression data D5 configuring the difference patch D6 is transmitted in Step S403, the update control unit 1001 of the software updating device 10 transmits a transmission completion notification to the ECU 11 through the data transmitting/receiving unit (CAN) 1002 in Step S407.

When the transmission completion notification transmitted from the software updating device 10 in Step S407 is received by the data transmitting/receiving unit 1102, the control unit 1101 of the ECU 11 gives a data recording instruction to the flash writing control unit 1104 in Step S408. In accordance with this instruction, the flash writing control unit 1104 writes data stored in the temporary area 11125 into the FROM 1113 as a part of the new program D2. At this time, first, in a case in which there is data that has not been written into the temporary area 11125 from the restoration buffer 11123, the flash writing control unit 1104 writes the data of the restoration buffer 11123 into the temporary area 11125, whereby one or a plurality of data blocks configuring the new program D2 are completed in the temporary area 11125. When a part of the new program D2 is restored in the temporary area 11125 in this way, next, the control unit 1101 verifies whether this is correctly restored. As a result, in a case in which the part of the new program D2 has correctly been restored, the flash writing control unit 1104 stores the data stored in the temporary area 11125 in a recording area of the new program D2 in the FROM 1113. An address of this recording area is designated in the data transmission start request received from the software updating device 10 in Step S401. On the other hand, in a case in which the part of the new program D2 has not correctly been restored, the control unit 1101 returns an abnormality response to the software updating device 10 through the data transmitting/receiving unit 1102. In addition, in a case in which it takes time to write data into the FROM 1113, a standby response is appropriately transmitted to the software updating device 10 using the data transmitting/receiving unit 1102 (S409).

When the writing of data into the FROM 1113 is completed in Step S408, the control unit 1101 of the ECU 11 transmits an acceptance response to the software updating device 10 through the data transmitting/receiving unit 1102 in Step S410.

As described above, every time when division data is received from the software updating device 10, the ECU 11 performs a restoration process using the division data and discards the division data for which restoration has been completed. Accordingly, compared to a case in which a restoration process is executed after reception of all the division data, a difference update of the program of the ECU 11 can be performed using a relatively small memory capacity.

FIG. 11 is a diagram illustrating an example of the configuration of commands exchanged between the software updating device 10 and the ECU 11 in the sequence diagram illustrated in FIG. 10.

A command D121 is a data transmission request transmitted from the software updating device 10 to the ECU 11 in Step S401 illustrated in FIG. 10 and is configured by command information D1211, D1212, D1213, D1214, and D1215. The command information D1211 is identification information of the command D121, and here, an identifier (ID) representing a data transmission start request is set. The command information D1212 is type information of data to be transmitted and represents whether the transmitted data is difference compression data, compression data, or a new program. The command information D1213 represents data lengths of the following command information D1214 and D1215. The command information D1214 represents a start address when data stored in the temporary area 11125 is written into the FROM 1113 in Step S408 illustrated in FIG. 10. The command information D1215 represents a size of the transmitted data.

A command D122 is an acceptance response transmitted from the ECU 11 to the software updating device 10 in Step S402 illustrated in FIG. 10 and is configured by command information D1221, D1222, and D1223. The command information D1221 is identification information of the command D122, and here, an identifier (ID) representing an acceptance response to a data transmission start request is set. The command information D1222 represents a data length of the following command information D1223. The command information D1223 represents a size of a data block that can be received once by the ECU 11. In this embodiment, in accordance with a size of the reception buffer 11121, for example, a value of 256 bytes is set as the size of a data block that can be received.

A command D123 is a data transmission command transmitted from the software updating device 10 to the ECU 11 in Step S403 illustrated in FIG. 7 and is configured by command information D1231, D1232, and D1233. The command information D1231 is identification information of a command D123, and, here, an identifier (ID) representing a data transmission command is set. The command information D1232 is counter information representing the number of times of transmission of the command D123, and the value thereof is incremented every time when the command D123 is transmitted from the software updating device 10 to the ECU 11. The command information D1233 is a main body of the division data of the difference patch D6 transmitted from the software updating device 10 to the ECU 11. This division data is set by dividing one piece of difference compression data D5 configuring the difference patch D6 into a plurality of parts using the software updating device 10 with a value designated in the command information D1223 included in the command D122 described above used as an upper limit size. For example, the transmission data D901 or D902 illustrated in FIG. 9 is stored in the command information D1233. In addition, as described above, the command D123 is transmitted from the software updating device 10 to the ECU 11 a plurality of number of times until all the data acquired by dividing one piece of difference compression data D5 configuring the difference patch D6 is transmitted.

A command D124 is a reception response transmitted from the ECU 11 to the software updating device 10 in Step S406 illustrated in FIG. 7 and is configured by command information D1241 and D1242. The command information D1241 is identification information of the command D124, and, here, an identifier (ID) representing a reception response to a data transmission command is set. The command information D1242 is counter information representing the number of times of transmission of the command D124, and a value that is the same as that set in the command information D1232 in the data transmission command D123 received immediately before from the software updating device 10 is set.

A command D125 is a transmission completion notification transmitted from the software updating device 10 to the ECU 11 in Step S407 illustrated in FIG. 7 and is configured by command information D1251. The command information D1261 is identification information of the command D126, and, here, an identifier (ID) representing a transmission completion notification is set.

A command D126 is a reception response transmitted from the ECU 11 to the software updating device 10 in Step S410 illustrated in FIG. 7 and is configured by command information D1261. The command information D1261 is identification information of the command D126, and, here, an identifier (ID) representing a reception response to a transmission completion notification is set.

A command D127 is a standby response transmitted from the ECU 11 to the software updating device 10 in Step S405 or S409 illustrated in FIG. 7 and is configured by command information D1271, D1272, and D1273. The command information D1271 is identification information of the command D127, and, here, an identifier (ID) representing a reject response to a command is set. The command information D1272 is information representing which command a reject response targets, and, here, identification information of a command received from the software updating device 10 immediately before is set. In other words, in this embodiment, in the command D127 transmitted in Step S405, a value that is the same as that set in the command information D1231 in the data transmission command D123 received from the software updating device 10 immediately before is set in the command information D1272. In addition, in the command D127 transmitted in Step S409, a value that is the same as that set in the command information D1251 in the data transmission command D125 received from the software updating device 10 immediately before is set in the command information D1272. The command information D1273 is an error code, and, here, a code representing a standby response is set.

<Configuration of Management Table>

FIG. 12 is a diagram illustrating the configuration of a management table 11122 stored in the SRAM 1112 of the ECU 11 in the first embodiment of the present invention. As illustrated in FIG. 12, the management table 11122 is configured by a difference restoration state T60 and a compressed/decompressed state T61. The difference restoration state T60 is configured by a size after restoration T601, a restoration-completed size T602, a restoration target T603, an output destination buffer address T604, a processing data section size T605, a current processing position T606, a halfway command T607, and a command T608. The compressed/decompressed state T61 is configured by a size after decompression T611, a decompression-completed size T612, and decompressing data T613.

The size after restoration T601 represents a data size after restoration that is after restoring a difference from the difference compression data D5 configuring the difference patch D6. Here, a value of the size after restoration D512 in the header section D51 of the difference compression data D5 configuring the difference patch D6 is stored.

The restoration-completed size T602 represents a data size of a part of the new program D2 that is in a restoration-completed state. Here, a value representing a data size of a part of the new program D2 for which restoration has been completed by the restoration process is stored.

The restoration target T603 represents data to be processed next. Here, in accordance with a current restoration state of the new program D2, one of "add command", "insert command", "move command", "addition data", and "insertion data" is stored. In addition, "add command", "insert command", and "move command" respectively correspond to the add command D4211, the insert command D4212, and the move command D4213 included in the command section D421 of the difference packet D42 described with reference to FIG. 7, and "addition data" and "insertion data" respectively correspond to the addition data D4221 and the insertion data D4222 included in the data section D432 of the difference packet D42.

The output destination buffer address T604 represents a memory address of a restoration destination of received data. Here, in accordance with a value of the restoration target T603, an address inside the restoration buffer 11123 or an address corresponding to a halfway command T607 of the management table 11122 is stored.

The processing data section size T605 represents a data size of a data section included in the difference packet that is a current processing target in the difference data D4.

The current processing position T606 represents a data size of a part, for which restoration has been completed, in a data section included in the difference packet that is the current processing target in the difference data D4.

The halfway command T607 is an area used for storing a part of a command section included in the difference packet corresponding to the division data that has been received by the ECU 11 in the difference data D4.

The command T608 is an area used for storing a command section included in the difference packet corresponding to the division data that has been received by the ECU 11 in the difference data D4.

The size after decompression T611 represents a data size after decompressing the difference compression data D5. Here, a value representing the data size of the difference data D4 is stored.

The decompression-completed size T612 represents a data size of a part of the difference data D4 for which the restoration has been completed. Here, a value representing a data size of a part of the difference data D4 for which decompression has been completed by the restoration process is stored.

The decompressing data T613 is an area used for temporarily storing division data that has been received in a case in which all the data required for a decompression process is not included in the division data that has been received.

The ECU 11 manages a restoration state of the new program D2 in the restoration process executed every time when division data is received using the management table 11122 as described above. Accordingly, between a previous restoration process and a following restoration process, the restoration process can be continuously performed while maintaining the continuity.

<Flow of Restoration Process>

FIG. 13 is a flowchart illustrating a restoration process executed by the restoration unit 1103 of the ECU 11 in Step S404 illustrated in FIG. 10 in the first embodiment of the present invention. When division data transmitted from the software updating device 10 in Step S403 illustrated in FIG. 10 is received, the data transmitting/receiving unit 1102 of the ECU 11 stores the received division data in the reception buffer 11121 and then, notifies the control unit 1101 of the reception of the division data. When the notification of the reception of the division data is received from the data transmitting/receiving unit 1102, the control unit 1101 instructs the restoration unit 1103 to perform restoration. When the instruction for restoration is received from the control unit 1101, the restoration unit 1103 starts the restoration process according to the flowchart illustrated in FIG. 13.

First, the restoration unit 1103 reads a value of the restoration target T603 from the management table 11122 in Step S40401.

Next, in Step S40402, the restoration unit 1103 determines a data type of the next processing target based on the value of the restoration target T603 read in Step S40401. As a result, in a case in which the next processing target is a command section out of a command section and a data section that are constituent elements of a difference packet described with reference to FIG. 7, the process proceeds to Step S40403, whereas in a case of the data section, the process proceeds to Step S40407.

In a case in which the process proceeds to Step S40403, the restoration unit 1103 designates a halfway command T607 in the management table 11122 as a temporary restoration destination of the command section that is the next processing target in Step S40403.

Next, the restoration unit 1103 decompresses a part of the received division data in Step S40420 and stores the decompressed part in the halfway command T607 of the management table 11122 designated as the restoration destination in Step S40403. In addition, at this time, in a case in which the received division data is fragmented in the middle of the binary code D807 or the LZ77 packet D803 described with reference to FIG. 8, data required for the decompression process is not sufficiently prepared, and accordingly, the part cannot be decompressed. Accordingly, in such a case, data that has not been decompressed in the received division data is stored in the decompressing data T613 of the management table 11122, and the decompression process is suspended. Then, the process of Step S40420 is stopped, and the process proceeds to Step S40405 for waiting for reception of the next division data.

Next, the restoration unit 1103 determines whether or not a command section is completed as a result of the decompression of Step S40404 in Step S40405. Here, in a case in which one of an add command, an insert command, and a move command that are constituent elements of the command section described with reference to FIG. 7 is completed using the data stored in the halfway command T607 of the management table 11122, the process proceeds to Step S40406. On the other hand, in a case in which none of such command sections is completed, the process proceeds to Step S40415. In such a case, the value stored in the halfway command T607 of the management table 11122 is maintained as it is.

In a case in which the process proceeds to Step S40406, the restoration unit 1103 copies data of the command section to the command T608 of the management table 11122 in Step S40406. In other words, data stored in the halfway command T607 of the management table 11122 is moved to the command T608. When the process of Step S40406 is executed, the process proceeds to Step S40415.

In a case in which the process proceeds from Step S40402 to Step S40407, the restoration unit 1103, in Step S40407, reads a value of the output destination buffer address T604 from the management table 11122 and designates a memory area inside the restoration buffer 11123 corresponding to an address represented by the value as a restoration destination of the data section that is the next processing target.

Next, the restoration unit 1103 decompresses a part of the received division data in Step S40421 and stores the decompressed part in the memory area inside the restoration buffer 11123 that has been designated as the restoration destination in Step S40407. In addition, at this time, in a case in which the received division data is fragmented in the middle of the binary code D807 or the LZ77 packet D803 described with reference to FIG. 8, data required for the decompression process is not sufficiently prepared, and accordingly, the part cannot be decompressed. Accordingly, in such a case, similar to Step S40420 described above, data that has not been decompressed in the received division data is stored in the decompressing data T613 of the management table 11122, and the decompression process is suspended. Then, the process of Step S40421 is stopped, and the process proceeds to Step S40422 for waiting for reception of the next division data.

Next, in Step S40422, the restoration unit 1103 determines a type of a data section acquired by decompressing a part of the division data in Step S40421. As a result, in a case in which the type of the data section is the insertion data among constituent elements of the data section described with reference to FIG. 7, the process proceeds to Step S40411, whereas in a case of the addition data, the process proceeds to Step S40423.

In a case in which the process proceeds to Step S40423, the restoration unit 1103, in Step S40423, performs an addition process of adding a value of a corresponding part of the old program D1 to the value of the data section that has been decompressed and stored in the restoration buffer 11123 in Step S40421. Data acquired by this addition process is set as a part of the new program D2. When the process of Step S40423 is executed, the process proceeds to Step S40411.

In a case in which the process proceeds from Step S40422 or S40423 to Step S40411, the restoration unit 1103 moves a pointer representing a read position of the old program D1 in Step S40411. Here, a read position used when the old program D1 is read next time is moved by a move amount represented by the move command stored in the command T608 of the management table 11122. Accordingly, in a case in which the process proceeds from Step S40422 to Step S40411, in Step S40414 described later, insertion data included in the received division data is inserted into to the old program D1. In addition, in a case in which the process proceeds from Step S40423 to Step S40411, in Step S40414, the data after addition that is acquired by the addition process of Step S40423 substitutes a part of the old program D1.

Next, the restoration unit 1103 determines whether or not a size of the data that is decompressed and stored in the restoration buffer 11123 in Step S40421 has reached a predetermined specified value in Step S40412. As a result, in a case in which the data size of the restoration buffer 11123 is equal to or greater than the specified value, the restoration unit 1103 notifies the control unit 1101 of an indication thereof and causes the process to proceed to Step S40413, whereas in a case of being less than the specified value, the process proceeds to Step S40415.

When the notification is received from the restoration unit 1103, the control unit 1101 transmits a standby response to the software updating device 10 through the data transmitting/receiving unit 1102 in Step S40413. In addition, the control unit 1101 instructs the flash writing control unit 1104 to record data.

When a data recording instruction is received from the control unit 1101, the flash writing control unit 1104, in Step S40414, stores data stored in the restoration buffer 11123 in the temporary area 11125 of the FROM 1113. After the process of Step S40414 is executed, the restoration unit 1103 returns the process to Step S40401 and continues the restoration process for the received division data.

When the process proceeds from Step S40405, S40406, or S40412 to Step S40415, the restoration unit 1103 updates the management table 11122 in Step S40415. Here, in accordance with a result of the process until now, counting-up of the restoration-completed size T602 and the current processing position T606, an update of the output destination buffer address T604, an update of the restoration target T603, or the like is performed.

Next, the restoration unit 1103 determines whether or not the processed data has reached the end of the received division data in Step S40416. As a result, in a case in which the data has not yet reached the end of the division data, it is determined that there remains data to be processed next, the process is returned to Step S40401, and the restoration process illustrated in FIG. 13 is continued. On the other hand, in a case in which the data has reached the end of the division data, in other words, in a case in which all the received division data has been processed, the restoration unit 1103 notifies the control unit 1101 of an indication thereof. When this notification is received from the restoration unit 1103, the control unit 1101 instructs the restoration unit 1103 to end the restoration process and wait until the next division data is received.

FIG. 14 is a diagram illustrating an overview of the flow of data in the restoration process according to the first embodiment of the present invention described above.

When the division data D1401 is received by the ECU 11 and is accumulated in the reception buffer 11121, the division data D1401 is decompressed through entropy decoding, and accordingly, a plurality of LZ77 packets D1411 each configured by an ID (packet type) D1412 and the data D1413 are restored. At this time, the LZ77 packet D1411 is restored from a plurality of binary codes D1404 included in the division data D1401. In addition, in a case in which the end of the division data D1401 stored in the reception buffer 11121 is fragmented in the middle of a binary code, and the LZ77 packet D1411 cannot be restored from the data D1405 up to the middle and other binary codes D1404, such data is stored in the decompressing data T613 of the management table 11122, and the decompression process is suspended until the next division data is received.

In addition, by decompressing a plurality of LZ77 packets D1411, the difference data configured by the command section D1421, the addition data D1422, and the insertion data D1423 is restored. This difference data is stored in the dictionary area 11124 of the SRAM 1112.

The command section D1421 of the difference data stored in the dictionary area 11124 is stored in the command T608 of the management table 11122. Based on a content of the command section D1421 stored in the command T608, the addition data D1422 is added to a part of the old program D1 and resultant data is stored in the restoration buffer 11123 as a part of the new program D2. In addition, the insertion data D1423 is stored in the restoration buffer 11123 as a part of the new program D2. In addition, in a case in which the end of the difference data stored in the dictionary area 11124 is fragmented in the middle of the command section, in other words, in a case in which the end of the division data D1401 stored in the reception buffer 11121 corresponds to a command section of the difference data, and thus, at least apart of the command section and the data section corresponding thereto is not included in the division data D1401, the data D1424 up to the middle is stored in the halfway command T607 of the management table 11122, and the restoration process is suspended until the next division data is received.

As described above, in the state of being in the middle of the restoration process, by storing information required for continuing the restoration process in the management table 11122, the received division data can be sequentially restored. As a result, an ECU can be provided which is capable of updating a program through a difference update even in a case in which a memory area that is sufficient for reception of the difference patch D6 cannot be secured as the reception buffer 11121.

According to the first embodiment of the present invention described above, the following operations and effects can be acquired.

(1) The ECU 11 that is an electric control device for vehicles capable of updating the old program D1 with the new program D2 includes: the FROM 1113 that stores the old program D1; the data transmitting/receiving unit 1102 that sequentially receives a plurality of pieces of division data acquired by dividing the difference compression data D5 acquired by compressing the difference data D4 for every predetermined data length; and the restoration unit 1103 that executes the restoration process for restoring the new program D2 based on each division data received by the data transmitting/receiving unit 1102 and the old program D1. The difference data D4, as illustrated in FIG. 7, includes a data section based on a difference between the old program D1 and the new program D2 and a command section used for generating the new program D2 by reflecting the data section on the old program D1. In a case in which at least a part of a command section and a data section is not included in the division data received by the data transmitting/receiving unit 1102 (Step S40405: No), the restoration unit 1103 executes the process of Steps S40415 and S40416 and then ends the flowchart illustrated in FIG. 13, thereby suspending the restoration process and waiting for reception of the next division data. In this way, a difference update can be applied to a program update of an electric control device for vehicles.

(2) In the difference data D4, a plurality of difference packets D42, D43, and D44 respectively acquired by combining command sections D421, D431, and D441 and data sections D422, D432, and D442 corresponding to each other are arranged. In such difference packets D42, D43, and D44, as illustrated in FIG. 7, the command sections D421, D431, and D441 and the data sections D422, D432, and D442 corresponding to each other are arranged respectively in order of the command sections D421, D431, and D441 and the data sections D422, D432, and D442. In a case in which an end of division data received by the data transmitting/receiving unit 1102 corresponds to one of the command sections D421, D431, and D441, the restoration unit 1103 determines "No" in Step S40405 illustrated in FIG. 13 and suspends the restoration process and waits for reception of the next division data. In this way, a case in which at least a part of a command section and a data section is not included in the division data is determined reliably, and waiting for reception of the next division data can be performed by suspending the restoration process.

(3) In a case in which an end of division data received by the data transmitting/receiving unit 1102 corresponds to a data section, the restoration unit 1103 executes a restoration process based on a content of the command section corresponding to the data section in Steps S40407 to S40411 illustrated in FIG. 13. In this way, in a case in which at least apart of a command section and a data section is included in the division data, the restoration process can be reliably performed using such data.

(4) As illustrated in FIG. 9, the division data received by the ECU 11 is transmission data D901 or D902 having a fixed length acquired by dividing the difference compression data D5 for every predetermined data length. The restoration unit 1103 performs a decompression process for returning a part of the difference compression data D5 into a part of the difference data D4 based on the division data received by the data transmitting/receiving unit 1102 in Steps S40420 and S40421 in the restoration process illustrated in FIG. 13. At this time, in a case in which data required for the decompression process is not included in the division data received by the data transmitting/receiving unit 1102, the restoration unit 1103 stops the process of Steps S40420 and S40421 and proceeds to the next process, and accordingly, the decompression process is suspended, and waiting for the reception of the next division data is performed. In this way, in a case in which the division data cannot be decompressed, waiting for reception of the next division data is performed, and the decompression process can be continued.

(5) Based on a content of the command section in the division data received by the data transmitting/receiving unit 1102, the restoration unit 1103 performs in the restoration process illustrated in FIG. 13 at least one of an insertion process (in a case in which the data type of the processing target is determined as insertion data in Step S40422) in which the data section is set as a part of the new program D2 as it is and an addition process of Step S40423 (in a case in which the data type of the processing target is determined as addition data in Step S40422) in which the data section and a part of the old program D1 are added, and a result of the addition is set as a part of the new program D2. In this way, the new program D2 can be generated by correctly reflecting the content of the data section in the received division data on the old program D1.

(6) In the ECU 11, in a case in which the data size of the new program D2 that is partly restored by the restoration process reaches a predetermined value (Step S40412: Yes), the flash writing control unit 1104 writes the part of the new program D2 in the temporary area 11125 that is a storage area different from an area of the FROM 1113 in which the old program D1 is stored (Step S40414). Accordingly, even in a case in which the capacity of the memory of the restoration buffer 11123 in which the new program D2 that is restored in the restoration process is partly stored is small, the whole new program D2 can be restored.

(7) In addition, in the ECU 11, before the flash writing control unit 1104 writes the new program D2 in the temporary area 11125, the control unit 1101 transmits a standby response used for suspending the transmission of division data to the software updating device 10 that is the transmission source of the division data (Step S40413). Accordingly, it can be prevented that division data is transmitted during recording of data in the temporary area 11125, and the division data cannot normally be received in accordance therewith.

Second Embodiment

Next, a second embodiment of the present invention will be described. In the first embodiment described above, an example has been illustrated in which the difference patch D6 is generated using the difference compression data D5 acquired by compressing difference data D4, and the program of the ECU 11 is updated. In contrast to this, a second embodiment described below illustrates an example in which, a difference patch D6 is generated without compressing difference data D4, so that the program of the ECU 11 is updated.

FIG. 15 is a diagram illustrating an example of the configurations of division data and a management table 11122 according to the second embodiment of the present invention. In this embodiment, as illustrated in FIG. 15, difference data D4 configured by difference packets D45, D46, D47, and the like is divided for every 256 bytes and resultant data is transmitted from the software updating device 10 to the ECU 11 as transmission data D1501 or D1502 having a fixed length.

The difference packets D45 and D47 are respectively configured by command sections (insert command) D451 and D471 and data sections (insertion data) D452 and D472. In addition, the difference packet D46 is configured by a command section (copy command) D461 and does not include a data section. In this way, the difference data D4 is configured by joining a plurality of difference packets each configured by a command section and a data section following the command section and is divided into a plurality of parts, and resultant data is sequentially transmitted from the software updating device 10 to the ECU 11. Accordingly, in the ECU 11, even when all the difference data D4 is not received, a restoration process can be sequentially performed every time when division data is received. For this reason, the restoration process can be performed with the memory saved.

In addition, in this embodiment, in the difference data D4, the add command described in the first embodiment is not used, and a data section is added only to an insert command, and a copy command is used for a part using information of the old program D1. Accordingly, even in a case in which the difference data D4 is not compressed, the amount of data transmitted from the software updating device 10 to the ECU 11 can be decreased.

In addition, as illustrated in FIG. 15, the management table 11122 according to this embodiment used in a case in which the difference data D4 is not compressed is similar to the management table according to the first embodiment illustrated in FIG. 12 except that the compressed/decompressed state T61 for data management of compression/decompression is not included.

FIG. 16 is a flowchart illustrating a restoration process according to the second embodiment executed by the restoration unit 1103 of the ECU 11 in Step S404 illustrated in FIG. 10. In the flowchart illustrated in FIG. 16, a same step number as that illustrated in FIG. 13 is assigned to each part performing a process that is the same as that of the first embodiment illustrated in FIG. 13. Hereinafter, description of the process having the same step number as that illustrated in FIG. 13 will not be presented unless it is particularly necessary.

After the process of Step S40403 is executed, the restoration unit 1103, in Step S40450, copies apart of received division data and stores the part in the halfway command T607 of the management table 11122 that is designated as a restoration destination in Step S40403. After the process of Step S40450 is executed, the process proceeds to Step S40405.

After the process of Step S40406 is executed, the restoration unit 1103, in Step S40452, determines a type of a command section copied to the command T608 of the management table 11122 in Step S40406. As a result, in a case in which the type of the command section is the insert command, the process proceeds to Step S40415. In this case, the value stored in the halfway command T607 of the management table 11122 is maintained as it is. On the other hand, in a case in which a type of the command section is the copy command, the process proceeds to Step S40453.

In a case in which the process proceeds to Step S40453, the restoration unit 1103 copies a part of the old program D1 designated in the copy command to the restoration buffer 11123 in Step S40453. When the process of Step S40453 is executed, the process proceeds to Step S40412.

After the process of Step S40407 is executed, the restoration unit 1103, in Step S40454, copies a part of the received division data into a memory area inside the restoration buffer 11123 designated as the restoration destination in Step S40407. When the process of Step S40454 is executed, the process proceeds to Step S40412.

After the process of Step S40414 is executed, the restoration unit 1103, in Step S40455, determines a type of a command section that is in the middle of being restored by referring to the command T608 of the management table 11122. As a result, in a case in which the type of the command section that is in the middle of being restored is the copy command, the process is returned to Step S40453, whereas in a case of the insert command, the process is returned to Step S40454.

FIG. 17 is a diagram illustrating an overview of the flow of data in the above-described restoration process according to the second embodiment of the present invention.

In the ECU 11, division data D1701 is received and is accumulated in the reception buffer 11121, and thus, command sections D17011 and D17012, a data section D17013, and data D17014 in which a command section is fragmented in the middle included in the division data D1701 are stored in the reception buffer 11121. Here, the command section D17011 is the copy command, and the command section D17012 is the insert command.

In the division data D1701 stored in the reception buffer 11121, in a case in which the processing target is the command section D17011 or the D17012, or the data D17014, contents thereof are sequentially copied to the halfway command T607 of the management table 11122. When a command is completed in the halfway command T607, a content thereof is stored in the command section T608 of the management table 11122. On the other hand, in a case in which the processing target is the data section D17013, based on the content of the command section D17012 stored in the command section T608 of the management table 11122, the data section D17013 is copied to the restoration buffer 11123. In addition, in a case in which the command section D17011 is stored in the command section T608 of the management table 11122, based on the content thereof, a part of the old program D1 that is designated is copied to the restoration buffer 11123.

As described above, also in this embodiment, in a state in which the restoration process is in the middle of the process, information required for continuing the restoration process is stored in the management table 11122, and accordingly, the received division data can be sequentially restored. As a result, an ECU can be provided which is capable of updating a program through a difference update even in a case in which a memory area sufficient for reception of the difference patch D6 cannot be secured as the reception buffer 11121

According to the second embodiment of the present invention described above, the data transmitting/receiving unit 1102 of the ECU 11 sequentially receives a plurality of pieces of division data acquired by dividing the difference data D4 for every predetermined data length. In a case in which at least a part of a command section and a data section is not included in the division data received by the data transmitting/receiving unit 1102 (Step S40405: No), the restoration unit 1103, by executing the process of Steps S40415 and S40416 and then ending the process of the flowchart illustrated in FIG. 16, suspends the restoration process and waits for reception of the next division data. Accordingly, similar to the first embodiment, a difference update can be applied to a program update of an electric control device for vehicles.

In addition, in the second embodiment described above, division data having the configuration illustrated in FIG. 15 has been described as being transmitted from from the software updating device 10 to the ECU 11. However, division data having the configuration illustrated in FIG. 7 described in the first embodiment may be divided into a plurality of pieces of data, and resultant data may be transmitted from the software updating device 10 to the ECU 11. In such a case, in the flowchart of the restoration process illustrated in FIG. 16, instead of Steps S40453 and S40454, the process of Step S40423 illustrated in FIG. 13 may be executed.

The embodiments described above are merely examples, and the present invention is not limited to the contents thereof as long as features of the present invention are maintained. In addition, while various embodiments have been described above, the present invention is not limited to the contents thereof. Other embodiments considered within the scope of the technical idea of the present invention belongs to the scope of the present invention as well.

Priority is claimed on Japanese Patent Application No. 2016-089031, filed Apr. 27, 2016, the content of which is incorporated herein by reference.

REFERENCE SIGNS LIST

1: vehicle
2: server

3: Internet
4: access network
10: software updating device
11, 12, 13: ECU
14: in-vehicle network
1101: control unit
1102: data transmitting/receiving unit
1103: restoration unit
1104: flash writing control unit

The invention claimed is:

1. An electric control device for a vehicle which updates an old program to a new program, the electric control device comprising:
   a storage device that stores the old program; and
   a processor programmed by instructions that cause the processor to:
   sequentially receive a plurality of pieces of division data, the pieces of the division data generated from difference data which corresponds to a difference patch and which has been divided according to a predetermined data length; and
   execute a restoration process which restores the new program based on each received piece of the division data and the old program,
   wherein:
   the difference data is configured by a plurality of difference packets, each respective difference packet including a command section and a data section which correspond to each other and are arranged in order from the command section to the data section in the respective difference packet, the data section is data based on a difference between the old program and the new program, and the command section is data used for generating the new program by reflecting the data section on the old program, and
   the processor is programmed to execute instructions that further cause the processor to:
   in a case in which an end of a latest received piece of the division data corresponds to a fragment of the command section, suspend the restoration process based on the latest received piece of the division data and wait for the reception of a next piece of the division data, and
   in a case in which the end of the latest received piece of the division data corresponds to the data section, execute the restoration process based on a content of the command section and the corresponding data section preceding the end of the latest received piece of the division data.

2. The electric control device for vehicles according to claim 1, wherein
   the pieces of the division data are generated from the difference data which has been compressed into difference compression data and divided according to the predetermined data length,
   the restoration process includes a decompression process which restores a part of the difference compression data into a part of the difference data based on the latest received piece of the division data prior to restoring the new program using the latest received piece of the division data, and
   in a case in which data required for the decompression process is not included in the latest received piece of the division data suspend the decompression process and wait for the reception of the next piece of the division data.

3. The electric control device for vehicles according to claim 1, wherein
   the processor is programmed to execute instructions that further cause the processor to execute the restoration process which includes at least one of an insertion process, in which the data section is set as a part of the new program as specified by a content of the corresponding command section, and an addition process in which the data section and a part of the old program are added and set as a part of the new program as specified by the content of the corresponding command section.

4. The electric control device for vehicles according to claim 3, wherein
   in a case in which a data size of the part of the new program is greater than or equal to a predetermined size, the part of the new program is written in a storage area different from a storage area in which the old program is stored in the storage device.

5. The electric control device for vehicles according to claim 4, wherein
   before the new program is written into the storage device, a standby response for causing transmission of the next piece of the division data to be on standby is transmitted to a transmission source of the pieces of the division data.

6. A program updating method for updating an old program stored in a storage device of an electric control device to a new program, the program updating method comprising:
   sequentially receiving, by the electric control device, a plurality of pieces of division data, the pieces of the division data generated from difference data which has been divided according to a predetermined data length; and
   executing, by the electric control device, a restoration process which restores the new program based on each received piece of the division data and the old program,
   wherein:
   the difference data is configured by a plurality of difference packets, each respective difference packet including a command section and a data section which correspond to each other and are arranged in in the order from the command section to the data section in the respective difference packet, the data section is data based on a difference between the old program and the new program, and the command section is data used for generating the new program by reflecting the data section on the old program,
   in a case in which an end of a latest received piece of the division data corresponds to a fragment of the command section, suspending the restoration process based on the latest received piece of the division data and waiting for the reception of a next piece of the division data in a case in which at least a part of the command section and the data section is not included in the received division data, and
   in a case in which the end of the latest received piece of the division data corresponds to the data section, executing the restoration process based on a content of the command section and the corresponding data section preceding the end of the latest received piece of the division data.

7. The program updating method according to claim 6, wherein the pieces of the division data are generated from the difference data which has been compressed into difference compression data and divided according to the predetermined data length, the restoration process includes a decompression process which restores a part of the difference compression data into a part of the difference data based on the latest received piece of the division data prior to restoring the new program using the latest received piece of the division data, and in a case in which data required for the decompression process is not included in the latest received piece of the division data, suspending the decompression process and waiting for the reception of the next piece of the division data.

8. The program updating method according to claim 6, wherein the restoration process includes at least one of an insertion process, in which the data section is set as a part of the new program as specified by a content of the corresponding command section, and an addition process in which the data section and a part of the old program are added and set as a part of the new program as specified by the content of the corresponding command section.

9. The program updating method according to claim 8, wherein in a case in which a data size of the part of the new program is greater than or equal to a predetermined size, the part of the new program is written in a storage area different from a storage area in which the old program is stored in the storage device.

10. The program updating method according to claim 9, wherein before the new program is written into the storage device, a standby response for causing transmission of the next piece of the division data to be on standby is transmitted to a transmission source of the pieces of the division data using the electric control device.

11. A server apparatus providing data to update an old program for an electric control device of a vehicle to a new program, the server apparatus comprising:

a storage device that stores the old program and the new program;

a processor programmed by instructions that cause the processor to:

divide the new program into a plurality of blocks, for each respective block of the new program, extract difference data based on a result of a comparison of the respective block of the new program and a corresponding part of the old program, the difference data being configured by a plurality of difference packets, each respective difference packet including a command section and a data section which correspond to each other and are arranged in in the order from the command section to the data section in the respective difference packet, the data section is data based on a difference between the corresponding part of the old program and the respective block of the new program, and the command section is data used for generating the respective block of the new program by reflecting the data section on the corresponding part of the old program, for each respective block of the new program, compress the difference data to generate difference compression data, sequentially join the difference compression data of the plurality of blocks to generate a difference patch, and distribute the difference patch to the vehicle having the electric control device and old program.

\* \* \* \* \*